US011557017B2

(12) United States Patent
Mackinnon, Jr.

(10) Patent No.: US 11,557,017 B2
(45) Date of Patent: Jan. 17, 2023

(54) PARALLELIZED PIPELINE FOR VECTOR GRAPHICS AND IMAGE PROCESSING

(71) Applicant: Google LLC, Mountain View, CA (US)

(72) Inventor: Allan Stuart Mackinnon, Jr., Seattle, WA (US)

(73) Assignee: Google LLC, Mountain View, CA (US)

( * ) Notice: Subject to any disclaimer, the term of this patent is extended or adjusted under 35 U.S.C. 154(b) by 604 days.

(21) Appl. No.: 16/613,169

(22) PCT Filed: Mar. 15, 2018

(86) PCT No.: PCT/US2018/022628
§ 371 (c)(1),
(2) Date: Nov. 13, 2019

(87) PCT Pub. No.: WO2018/212826
PCT Pub. Date: Nov. 22, 2018

(65) Prior Publication Data
US 2020/0211148 A1 Jul. 2, 2020

Related U.S. Application Data

(60) Provisional application No. 62/508,096, filed on May 18, 2017.

(51) Int. Cl.
*G06T 11/40* (2006.01)
*G06T 1/20* (2006.01)
(52) U.S. Cl.
CPC ..................................... *G06T 1/20* (2013.01)

(58) Field of Classification Search
CPC .................................. G06T 1/20; G06T 11/40
See application file for complete search history.

(56) References Cited

U.S. PATENT DOCUMENTS

2016/0179574 A1\* 6/2016 Merrill, III ........... G06F 9/5066
718/106
2017/0032488 A1\* 2/2017 Nystad ...................... G06T 1/20

OTHER PUBLICATIONS

Wang et al., Parallel scan line algorithm for rapid rasterization of vector geographic data, 2013, 013ElsevierLtd., pp. 32-41 (Year: 2013).\*
International Search Report and Written Opinion for Application No. PCT/US2018/022628 dated Jul. 11, 2018.
(Continued)

*Primary Examiner* — Samantha (Yuehan) Wang
(74) *Attorney, Agent, or Firm* — Botos Churchill IP Law

(57) ABSTRACT

This technology relates to rasterizing and compositing vector graphics in parallel on a data-parallel computing device. For example, vector data of the vector graphics, may be loaded into local memory accessible by the one or more parallel processors. The vector data may include one or more paths comprised of one or more path segments of the vector graphics. The one or more parallel processors may rasterize the one or more path segments into respective rasters and assign each of the rasters into groups based on pixel coordinates of the respective rasters. Each group may have an associated key and the rasters within each group represent a portion of the same vector graphic. The rasters may be placed onto subpixels according to their respective pixel coordinates and rendered onto a display by the one or more parallel processors.

23 Claims, 18 Drawing Sheets

(56) References Cited

OTHER PUBLICATIONS

Wang Yafei et al: "Parallel scanline algorithm for rapid rasterization of vector geographic data", Computers and Geosciences, vol. 59, Sep. 2013 (Sep. 2013), pp. 31-40, XP028685384, ISSN: 0098-3004, DOI: 10.1016/J.CAGEO.2013.05.005.
Eldridge, Matthew, ""Designing Graphics Architectures Around Scalability and Communication"", Internet Citation, (Jun. 1, 2001), page Complete, XP007907634, Retrieved from the Internet:URL:http://graphics.stanford.edu/papers/eldridge_thesis/eldridge.phd.pdf[retrieved on Mar. 12, 2009].

\* cited by examiner

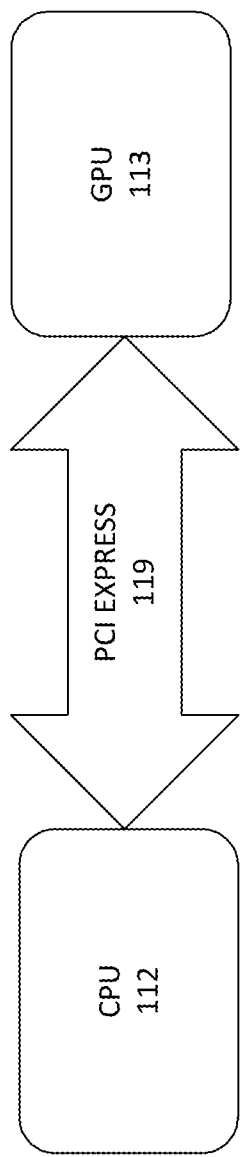
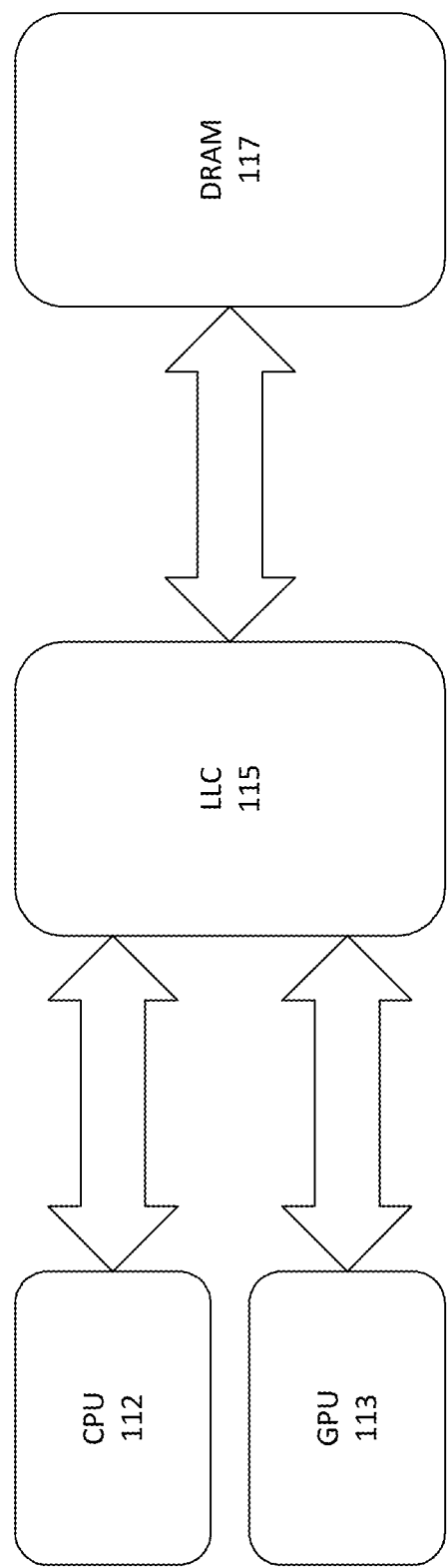
Figure 3A
Figure 3B

PARALLELIZED PIPELINE FOR VECTOR GRAPHICS AND IMAGE PROCESSING

CROSS-REFERENCE TO RELATED APPLICATIONS

The present application is a U.S. National Stage application Under 35 U.S.C. § 371 of PCT application No. PCT/US2018/022628, filed Mar. 15, 2018, which claims the benefit of the filing date of U.S. Provisional Application No. 62/508,096, filed May 18, 2017, the entire disclosures of which are hereby incorporated by reference.

BACKGROUND

Processing and displaying vector graphics, such as a web page's type on a laptop's display or a map on a smartphone's touch screen, requires significant processing resources. As the number and size of displays continue to grow, faster, more efficient processing of vector graphics becomes necessary. However, declining advances in processing performance using current vector graphics processing techniques threatens to reduce the use of vector graphics.

Many methods of processing vector graphics data rely on a computing device's central processing unit (CPU), with or without assistance from a graphical processing unit (GPU). For decades, vector graphics processing has been seen as being incompatible with data-parallel computing devices like GPUs. As such, most vector graphics processing techniques fail to take advantage of the GPU's ability to process data in parallel.

Current vector graphics processing techniques tend to focus on accelerating only a fraction of a complete vector graphics processing pipeline using parallel processing, with the remainder continuing to be processed with scalar CPU algorithms. While modest speedups relative to the available computing power of the GPU have been realized by performing a portion of the vector graphics processing pipeline in parallel, the bulk of the GPU's computing power is not utilized. Additionally, energy inefficiencies are prevalent in in current vector graphics techniques due to the continual utilization of both the scalar CPU and the GPU. Moreover, most of these vector graphics techniques sacrifice visual quality with imprecise antialiasing.

SUMMARY

Embodiments within the disclosure relate generally to processing vector graphics on a computer system. One aspect includes a method for rasterizing and compositing vector graphics in parallel on a data-parallel computing device. The method comprising loading, by one or more parallel processors, vector data of the vector graphics into local memory accessible by the one or more parallel processors, wherein the vector data includes one or more paths comprised of one or more path segments of the vector graphics; rasterizing, by the one or more parallel processors, the one or more path segments into respective rasters; assigning, by the one or more parallel processors, each of the rasters into groups based on pixel coordinates of the respective rasters, wherein each group has an associated key and the rasters within each group represent a portion of the same vector graphic; placing, by the one or more parallel processors, the rasters onto subpixels according to their respective pixel coordinates; and rendering, by the one or more parallel processors, the rasters onto a display.

In some examples, loading the vector data occurs in response to the one or more parallel processors receiving pull commands which identify a location of the vector data in a host memory.

In some examples, loading the vector data further includes simultaneously building a path data structure for each of the one or more paths in the vector data.

In some examples, each path data structure includes a respective path head as a root node to linked list data structures comprising blocks, each respective path head containing descriptive information about a total path calculated during pull commands.

In some examples, for each path head, the descriptive information about the total path includes one or more of (i) a total number of blocks which were required for a path, (ii) how many lines and curves are in the path, (iii) the total path's 2D bounds, and (iv) a head node indicating a location of a first path node in the linked list data structure.

In some examples, each path head is associated with path nodes.

In some examples, each path node includes a segment count block which stores a total number of segments within the respective path node and a next node block which stores a location of the next path node in the linked list.

In some examples, each path node includes path segment blocks storing indices which point to blocks of data associated with the one or more path segments.

In some examples, the path segment blocks include a type block which defines geometry of the path segments which make up the path represented by the path node, wherein the geometry may be curves or a line segments.

In some examples, the rasterizing includes converting path segments into tile trace subpixels (TTSs), and packing the TTSs into tile trace subpixel blocks (TTSBs).

Another aspect includes a non-transitory computer readable medium storing instructions, which when executed by one or more parallel processors, cause the one or more parallel processors to perform the steps of: loading vector data of vector graphics into local memory accessible by the one or more parallel processors, wherein the vector data includes one or more paths comprised of one or more path segments of the vector graphics; rasterizing the one or more path segments into respective rasters; assigning each of the rasters into groups based on pixel coordinates of the respective rasters, wherein each group has an associated key and the rasters within each group represent a portion of the same vector graphic; placing rasters onto subpixels according to their respective pixel coordinates; and rendering the rasters onto a display.

Another aspect includes a system for rasterizing and compositing vector graphics in parallel comprising: one or more data-parallel computing devices; and memory storing instructions, the instructions executable by the one or more data-parallel computing devices, wherein the instructions comprise: loading vector data of vector graphics into local memory accessible by the one or more parallel processors, wherein the vector data includes one or more paths comprised of one or more path segments of the vector graphics; rasterizing the one or more path segments into respective rasters; assigning each of the rasters into groups based on pixel coordinates of the respective rasters, wherein each group has an associated key and the rasters within each group represent a portion of the same vector graphic; placing rasters onto subpixels according to their respective pixel coordinates; and rendering the rasters onto a display.

BRIEF DESCRIPTION OF THE DRAWINGS

The present technology is illustrated by way of example, and not by way of limitation, in the figures of the accompanying drawings in which like reference numerals refer to similar elements including:

FIG. 3A is an example of a separate memory architecture in accordance with aspects of the disclosure.

FIG. 3B is an example of a unified memory architecture in accordance with aspects of the disclosure.

DETAILED DESCRIPTION

Overview

Figure 1:
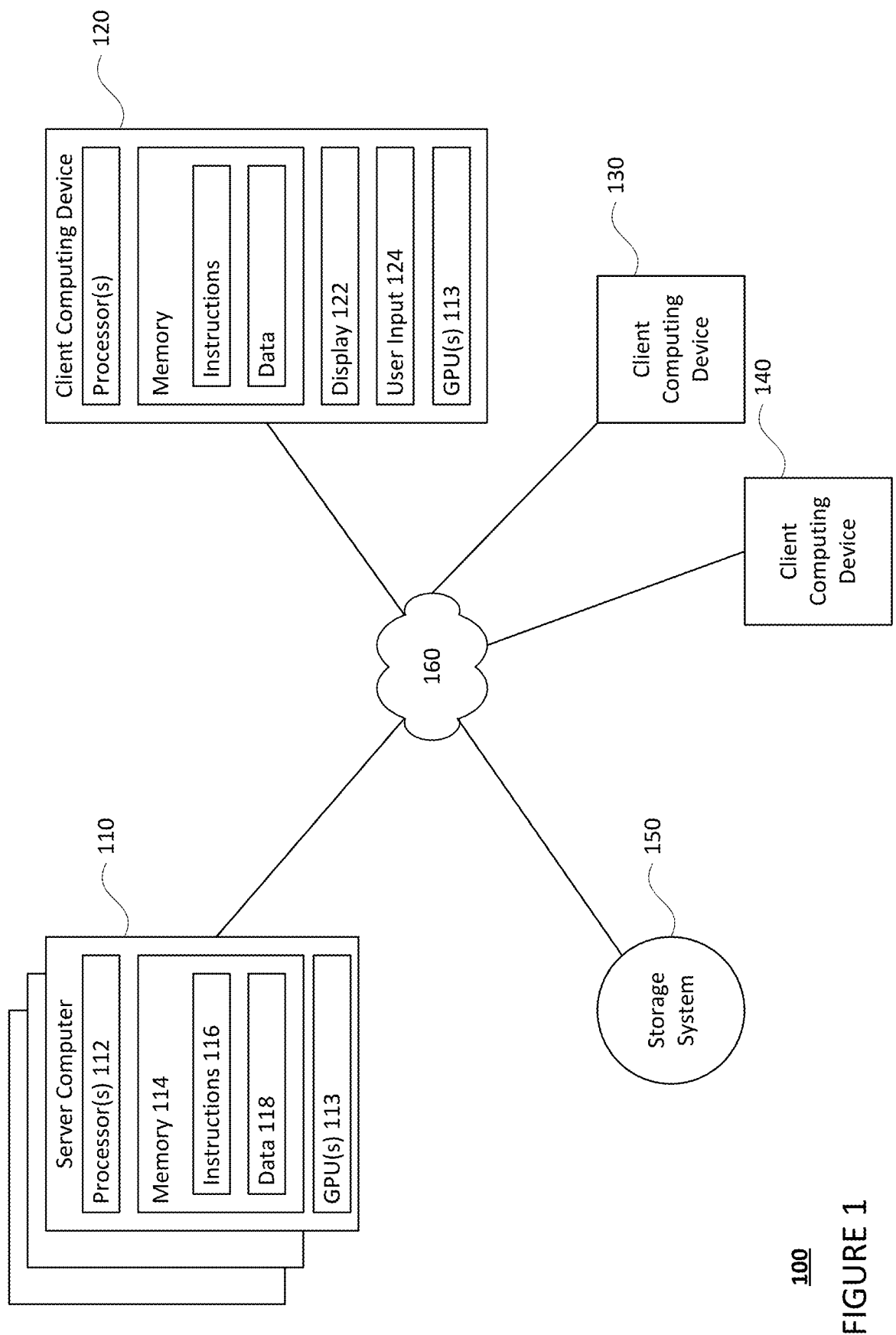
FIG. 1 is a functional diagram of an example system in accordance with aspects of the disclosure.

This technology relates to rasterizing, compositing, and otherwise manipulating (collectively herein referred to as "processing") vector graphics on a computer system. In particular, the processing of vector graphics is performed on data-parallel computing devices using a fully parallelized processing pipeline. The parallelized processing pipeline may be implemented and controlled through customized application programming interfaces (APIs) which provide the data-parallel computing device, such as a graphics processing unit (GPU), with access to kernel programs. The kernel programs may be executed by the data-parallel computing device to perform the processing. In this regard, each respective kernel may constitute a portion of the parallelized processing pipeline, with each kernel utilizing standard APIs and sub-APIs to perform all of the processing of the vector graphics.

The steps of the parallelized processing pipeline may include the steps of pulling vector path, rasterizing the pulled data, sorting and segmenting the rasterized data, prefixing the sorted and segmented data, placing the prefixed data, and rendering the placed data onto a display. Each of the steps may be implemented by one or more of the kernels. The vector path may be comprised of data representing path segments, untransformed bounds, metadata, and memory footprints of the respective vector graphics.

Pulling vector data includes moving blocks of concatenated vector data from a host memory location to an efficiently traversable data structure that is allocated and managed by the GPU. For instance, a processor in the computer system, such as the CPU, may transfer sequential path data contained in the vector data from a host memory, such as memory accessible to the CPU into memory accessible by the GPU, such as the GPU's discrete memory. In this regard, the sequential paths data from the host memory may be reorganized into a number of fixed-size blocks dependent upon the GPU's natural transaction size, such that a bus separating the GPU from the host memory location may be utilized more efficiently.

In one example, the vector data may be moved from the host memory location to the GPU's discrete memory, by the CPU appending pull commands into the GPU's command buffer, from which the GPU retrieves its instructions. The pull commands may contain the paths' host ID, number of full path nodes before the current pull command, an offset into the CPU memory segment region, and the number of memory segment regions that the node should copy. In some instances, other techniques to move the path data (e.g., sequences of line endpoints and curve control points) from the host's memory to memory accessible by the GPU, such as the GPU's discrete memory, may be used.

A pull kernel may then be launched by the GPU, causing the GPU to execute the pull commands within its command buffer. In this regard, upon a threshold number of pull commands being appended into the GPU's command buffer, after a predetermined amount of time has passed, and/or the GPU attempting to access a sub-kernel within the pull kernel, the GPU may launch the pull kernel. The pull kernel may cause the GPU to execute the pull commands which reserves memory blocks to store the respective path nodes in the GPU's discrete memory. Subsequently, the GPU may copy the path nodes into a data structure.

The paths within the data structure may be rasterized by the GPU to create a raster which represents a transformed path that's suitable for rendering and other post-rasterization activities such as hit detection, clipping, and masking. Prior to rasterizing the paths, the GPU may execute a number of kernels which prepare the GPU's memory and the paths for rasterization. In this regard, the GPU may execute a copy transforms kernel which copies the transformation matrices into the GPU's memory when the GPU is discrete. The GPU may further execute an allocate raster kernel and an expand raster kernel. The allocate raster kernel may cause the GPU to allocate memory blocks for the raster heads which will be processed by the kernel grid. The expand raster kernel may cause the CPU to generate and update a raster cohort ID map which maps a raster cohort ID to a full-sized device raster ID. For instance, the raster cohort ID may be comprised of 15 bits or more or less and be mapped to a full-sized device raster ID of 32 bits or more or less, although other bit sizes may be used for the raster cohort ID and device raster ID.

The GPU may then launch the rasterize kernel which converts the paths into pixels. In this regard, the rasterize kernel splits the lines and curves of the paths into subpixel line segments. For example, the rasterize kernel may load one or more path segments belonging to the same raster and split the transformed lines and curves into subpixel line segments. The subpixel line segments may then be stored as a tile trace subpixel (TTS) structure.

Figure 9:
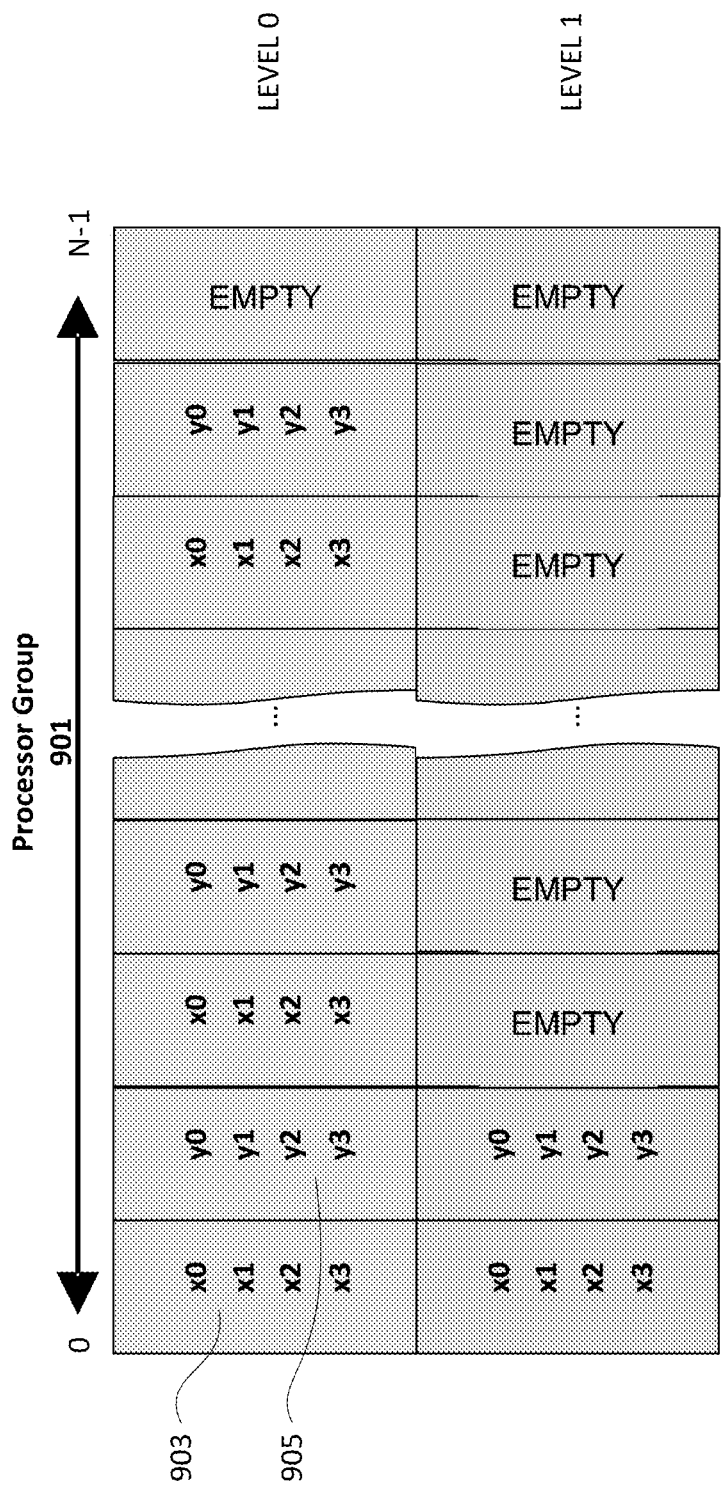
FIG. 9 is an illustration showing the placement of TTS structures into a tile trace subpixel block structure of a parallel processing device's memory in accordance with aspects of the disclosure.

Each TTS structure may be stored within an active tile bin associated with a subpixel location. The number of active tile bins may be finite and dependent upon the processing and memory capabilities of the GPU. In the event that an active tile bin is full or needs to be flushed, the TTS structures may be purged. In this regard, the GPU may place the TTS structures within an active tile bin into a tile trace subpixel block (TTSB) structure stored in the GPU's memory, as shown in FIG. 9. A tile trace subpixel key (TTSK) that records the raster cohort ID, the tile coordinates, and the address of the TTSB may be created and appended to a queue in the GPU's local memory. Upon the TTSK queue becoming full or requiring a flush due to subpixel line segments belonging to a different tile bin being processed, the TTSKs may be appended in bulk to an extent that will be sorted later.

The tile trace subpixel keys may be sorted and segmented to enable parallel rendering of the paths based on their respective subkeys. In this regard, the GPU may execute a TTSK sort and segment kernel which sorts the TTSKs by their subkeys and groups the TTSKs by a raster cohort ID subkey. For example, each TTSK may include three subkeys, or more or less, including a raster cohort ID, a Y tile coordinate, and a X tile coordinate. The TTSKs may be sorted according to the subkeys. After the sortation is complete, the TTSKs may be grouped by each raster cohort ID, y tileline, and x tileline.

The TTSK sort and segment kernel may compare each sorted TTSK with its predecessor and if a certain number of bits differ, then an index of the sorted TTSKs is appended to an extent. In this regard, each index marks the beginning of a sequence of TTSK that belong to a raster cohort ID. The TTSK sort and segment kernel may also calculate how many tile trace prefix blocks (TTPB), TTPK nodes, and TTSK nodes will used within a subsequent prefix post-processing stage, and pre-allocate blocks for the calculated number of TTPB, TTPK nodes, and TTSK nodes.

The TTSB blocks produced by the rasterize kernel and the TTSKs processed by the TTSK sort and segment kernel may require an additional post-processing step. In this regard, the GPU, for each index, may execute a prefix kernel which sequentially loads the TTSKs within the index and stores the TTSKs into the preallocated TTSK nodes. The prefix kernel may, upon determining that the TTSK tile coordinates change, store the accumulated TTP values into the preallocated TTPB block, construct a TTPK key, and store the TTPK key into the preallocated TTPK node. In other words, the TTSKs may be sorted, and in a final pass of the sort (or via a dedicated sorting kernel) various statistics and indices are calculated based on the number of changes in the tile coordinate (YX) and raster cohort ID (R). Upon a span of TTSKs changing to a new coordinate (YX) a TTPK key and TTPB block may be calculated. The total number of TTPKs per raster cohort ID may be determined and used to generate a raster structure that points to these TTPKs. In the event the TTSK raster ID changes, the prefix kernel may exit.

The TTSs in the TTSB block may then be assigned a pointer to the TTSK key and the TTS altitudes may be scatter-added to a 1×H array. At the end of the prefix stage, each raster has the following associated data: a) a list of TTSK nodes containing TTSKs pointing to TTSBs containing TTSs; b) a list of TTPK nodes containing TTPKs pointing to TTPBs containing TTP altitudes; c) a total count of TTSKs; d) a total count of TTPKs; and e) tight axis-aligned bounds with subpixel resolution. This raster structure allows the GPU to grab all the necessary data in a single pull, as opposed to grabbing blocks from the block data pool one at a time. In some embodiments a long path may require multiple passes through the rasterize, sort and segment, and prefix kernels to be processed.

Figure 11:
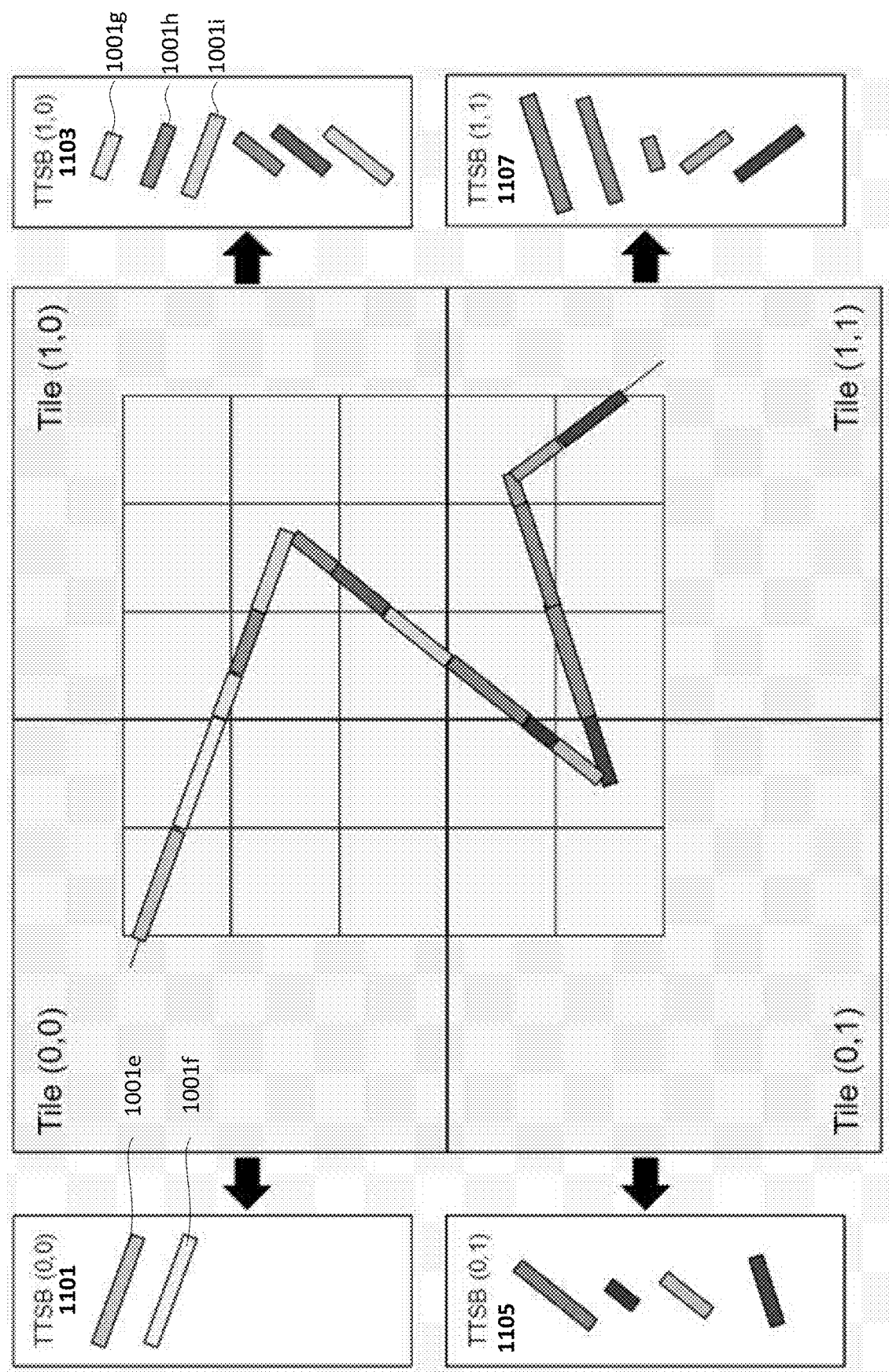
FIG. 11 is an example illustration of a place determination in accordance with aspects of the disclosure.

A place kernel may executed by the GPU to specify that a raster should be subpixel translated and then rendered on a particular layer in a composition comprised of an array of tile trace composition keys (TTCKs). Each composition may be treated as one or more bins of spatially partitioned TTCK keys. For example, the place kernel may cause execution groups, corresponding to the GPUs processors, to perform a place determination as shown in FIG. 11. In this regard, each execution group may determine if the raster's bounds are in or outside of the composition bounds. In the event the raster's bounds are outside of the composition the place determination is cancelled. Otherwise, for all TTSKs in the TTSK node the place kernel a) translates the TTSK key; b) converts the TTSK key into a TTCK key; c) appends the TTCK key to a local queue; and d) in the event the local queue is full or needs to be flushed then append it to the composition's TTCK key extent.

Similarly, for all TTPK keys in the TTPK node hierarchy the place kernel causes the GPU to a) translate the TTPK key; b) expand the TTPK key since it may span multiple tiles; c) clip the expanded tile range; d) convert each TTPK key into a TTCK key; e) append each TTCK key to a local spatially binned queue; and 0 if the local spatially binned queue is full or needs to be flushed, then append it to the composition's one or more spatially binned TTCK key extents. Again, as the tile position of each TTCK is known, the composition may be treated as one or more bins of spatially partitioned TTCK keys. As such, the number of bits required to represent the tile's X and Y coordinates in the TTCK composition may be reduced.

A TTCK sort and segment kernel may be executed by the GPU to sort the TTCKs by a group of subkeys. In this regard, the TTCK sort phase arranges the TTCKs so that all keys belonging to the same tile are in increasing layer order. The TTCK segment stage discovers the starting index of the first TTCK key for a tile. For example, each TTCK may include three subkeys, or more or less, including a Y tile coordinate, a X tile coordinate, and a layer index. The TTCKs may be sorted according to the subkeys, starting with the Y tile coordinate, then the X tile coordinate, and finally the layer index. After the sortation is complete, the TTCKs may be grouped by each tile coordinate and in increasing layer order.

The TTCK sort and segment kernel causes the GPU to compare each sorted TTCK with its predecessor. In the event that a number of bits differ then the index of the sorted index, the sorted TTCK is appended to an extent. Each index may mark the beginning of a sequence of TTCKs that belong to a tile at position (X,Y).

Figure 14:
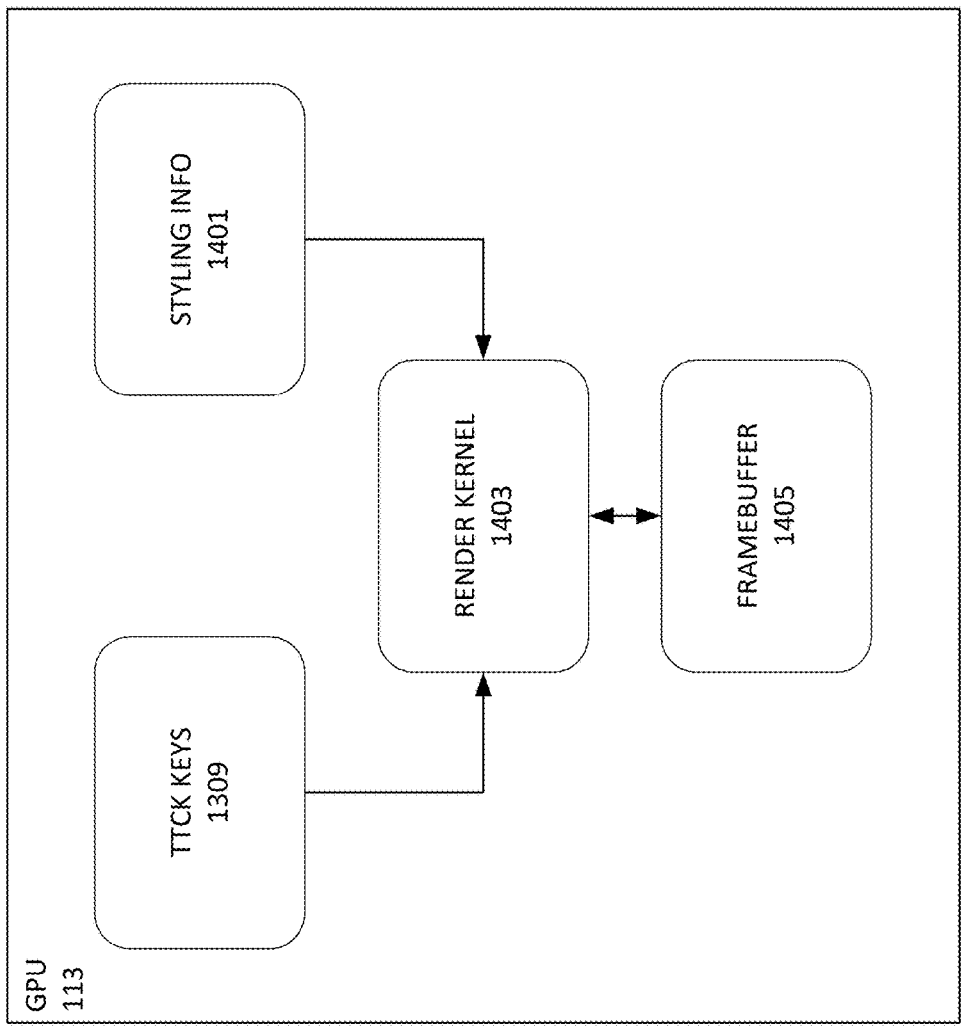
FIG. 14 is a block diagram outlining the rendering of raster in accordance with an embodiment.

Upon sorting and segmenting the TTCKs, the GPU may then render the raster. In this regard, the GPU may execute a render kernel, as shown in FIG. 14, which in turn, launches an execution group for each tile in the TTCK key extent. The function of each execution group is to decode the TTCK keys into filled path outlines that are blended with adjacent layers. In this regard, each execution group processes a fixed-size tile of pixels and allocates various tile-sized blocks of memory. When there are no more keys left to process or the tile is commanded to flush, the blended pixels are stored or composited onto a target surface.

The features described above allow for processing vector graphics on a data-parallel computing device in a fully parallelized manner. Such parallelized processing offers significantly faster more efficient vector graphic processing than offered by current CPU, GPU, and hybrid vector graphics engines. Further, by processing the vector graphics completely on the data-parallel computing device, the system's CPU(s) may be free to perform other processing tasks simultaneously.

Example Systems

Figure 2:
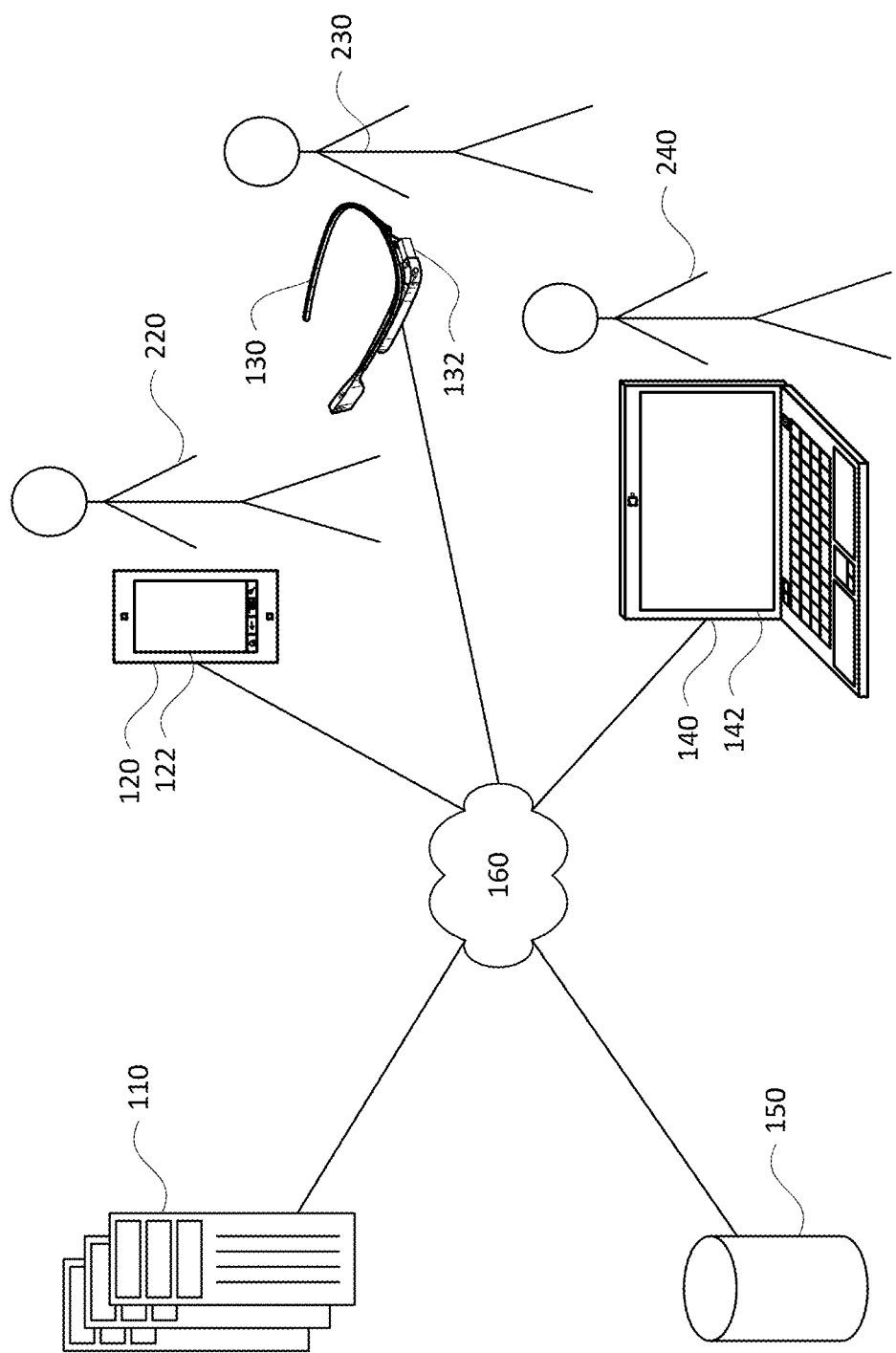
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, 130, and 140 as well as storage system 150. Each computing device may contain one or more processors 112, memory 114 and other components typically present in general purpose computing devices. Memory 114 of each of computing devices 110, 120, 130, and 140 may store information accessible by the one or more processors 112, including instructions 116 that can be executed by the one or more processors 112.

The memory may store data that can be retrieved, manipulated or stored by one or more processors. The memory may be of any non-transitory type capable of storing information accessible by the processor, such as a hard-drive, memory card, ROM, RAM, DVD, CD-ROM, write-capable, and read-only memories. Data elements, such as instructions 116 and data 118, may be held in memory spaces. For example, a graphics processing unit have several memory spaces including: registers, constants, indexable shared local memory, global device memory, local memory, stack memory, parameter memory, and texture memory. Each of these memory spaces may have different properties including different latency, size, concurrent access restrictions relative to the current processing element which, if any, processing elements can access this memory space, random access and indexability defining whether data can be accessed by an index or handle and for what purpose, writability, bandwidth, and access pattern penalties such as bank conflicts, coalescing, cache misses, partition camping, etc. The registers may be directly accessible by processors in a multiprocessor.

The instructions 116 may be any set of instructions to be executed directly, such as machine code, or indirectly, such as scripts, by the one or more processors. In that regard, the terms "instructions," "kernels," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor.

The one or more of computing devices 110, 120, and 130 may include specialized hardware components to perform specific computing processes in parallel, such as rasterizing, compositing, and otherwise manipulating vector graphics faster or more efficiently. For instance, the one or more graphics processing units 113 ("GPU") may be any conventional graphics processing units, such as those produced by Intel, AMD, and NVIDIA. Additionally, the one or more GPUs may be single instruction, multiple data (SIMD) devices, single instruction, multiple thread devices (SIMT). Each GPU 113 may have a natural transaction size, such as such as 64, 128, or 256 bytes, or more or less, which equate to 16, 32, or 64 words, respectively. The natural transaction size may be the GPU's architectural width (i.e., within a multiprocessor, such as GPU 113, the number of words which may be processed in a single cycle.)

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, 130, and 140 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices, and may perform all or some of the features described herein.

Each of the client computing devices 120, 130, and 140 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. In an additional example, client computing device 140 may be a digital camera, such as a 360-degree camera or digital single-lens reflex camera. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

The CPU and GPU may have a separate or unified memory architecture, as shown in FIGS. 3A and 3B, respectively. A separate memory architecture, also known as a discrete memory system, may be comprised of the CPU 112 and GPU 113 having their own discrete memories. In order to transfer data between the CPU and GPU memories, a bus, such as PCI Express 119 may be utilized, as shown in FIG. 3A. In a unified memory device the CPU and GPU may share caches and provide memory coherency across its processing elements. For instance, as shown in FIG. 3B, the CPU 112 and GPU 113 share a memory interface comprising a local level cache 115 and dynamic random access memory 117.

Example Methods

Figure 4:
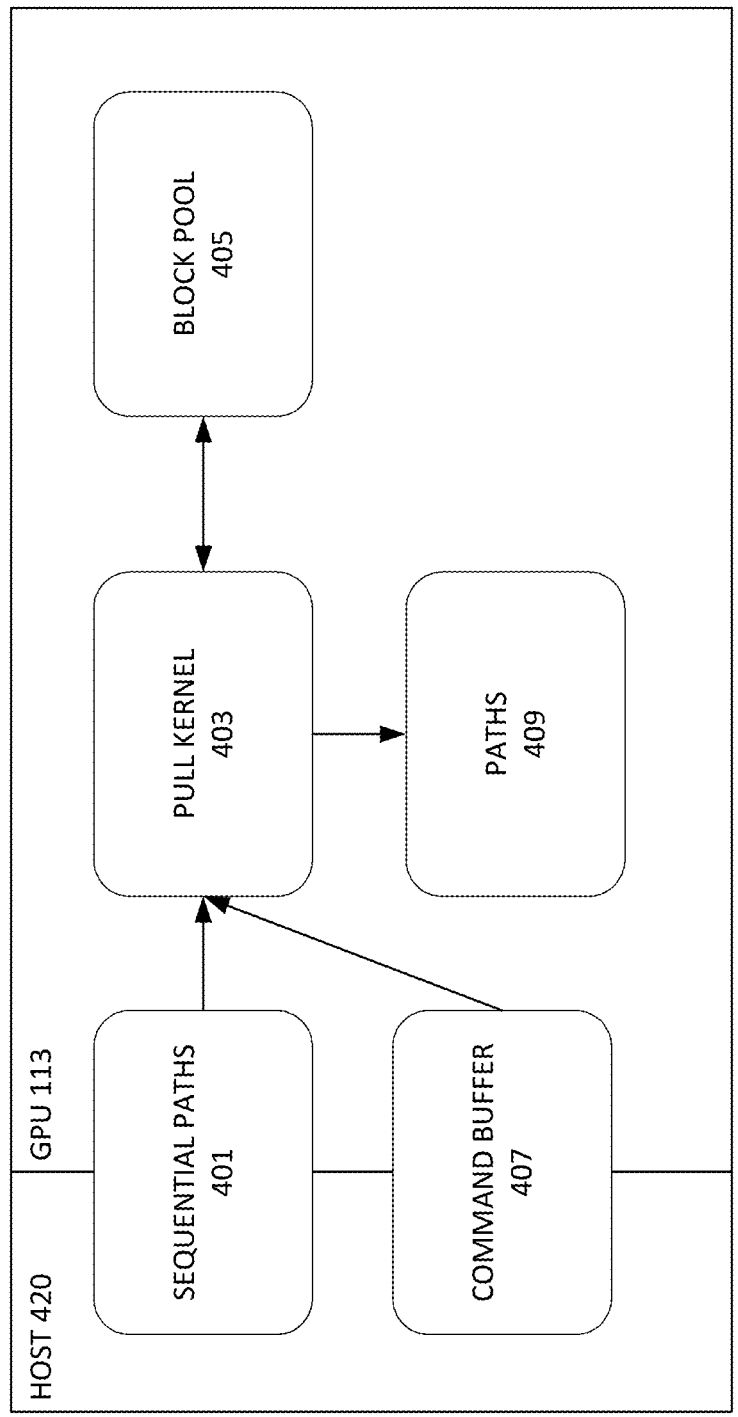
FIG. 4 is a block diagram of the pull kernel process in accordance with aspects of the disclosure.

Turning first to the pulling step, blocks of concatenated vector path data may be moved from a host memory location to an efficiently traversable data structure that is allocated and managed by the GPU. For instance, a processor in the computer system, such as the CPU 112, may transfer the vector path data, including sequential path data 401, from a host memory 420 into memory accessible by the GPU 113, such as the GPU's discrete memory, as shown in FIG. 4. In this regard, the sequential path data from the host memory 420 may be reorganized into a number of fixed-size blocks dependent upon the GPU's natural transaction size, such that a bus separating the GPU 113 from the host memory may be utilized more efficiently. The fixed-size blocks may be further dependent upon the GPU's natural processing size, such as 64, 128, or 256 bytes, or more or less, which equate to 16, 32, or 64 words, respectively. The pulling step may be bypassed in the event the CPU and GPU share the same memory location, such as a shared cache.

In order to transfer the vector path data from the host memory to the GPU's discrete memory, the CPU may then append pull commands into the GPU's command buffer 407, from which the GPU 113 retrieves its instructions. Each pull command may point to a small portion of the total path residing in the host memory. The GPU may execute all of the pull commands in parallel and copy data from the host memory to the GPU's memory. Each pull command may contain the paths' host ID (i.e., location where the vector path data may be found), number of full path nodes before the current pull command, an offset into the host memory segment region, and the number of memory segment regions that the node should copy. The pull commands may be executed by a pull kernel 403 upon a threshold number of pull commands being appended into the GPU's command buffer, after a predetermined amount of time has passed, and/or when the GPU attempts to access a sub-kernel within the a pull kernel 403.

Figure 5:
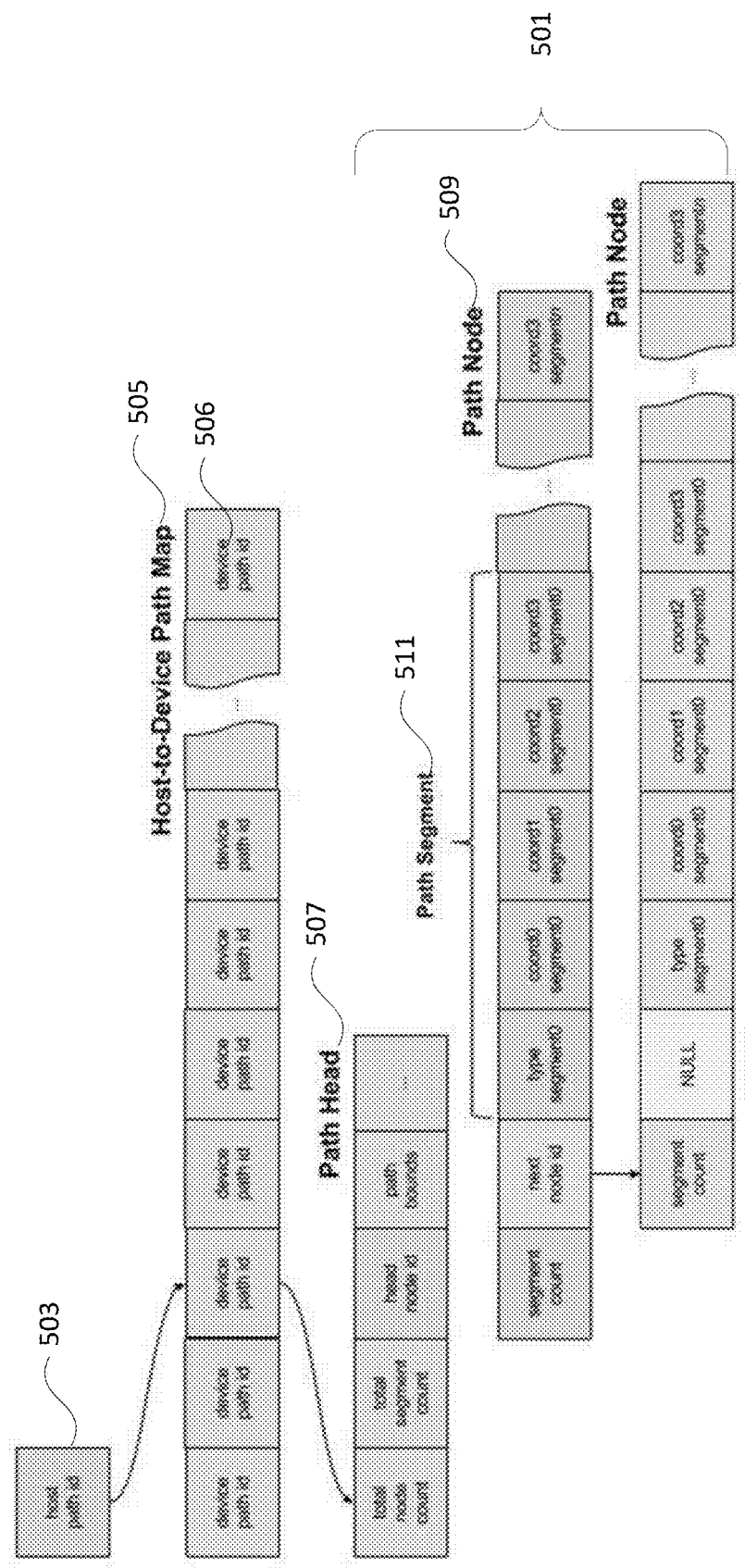
FIG. 5 is an example a path data structure in accordance with aspects of the disclosure.

While performing the pull command, the GPU may simultaneously build a path data structure 501 for each distinct vector path, as shown in FIG. 5. In this regard, GPU's are not typically designed with efficient and performant dynamic memory allocator, therefore the GPU is programmed to perform its own memory allocation. Accordingly, the path data structures 501 in the parallelized pipeline are built from fixed-size blocks of memory which allows the parallelized pipeline to quickly acquire and release the fixed-sized blocks from a data block pool 405. The GPU may reserve enough blocks of memory in the data block pool 405 of the GPU to store the path data structure 501. By performing the pull command and building the data structure simultaneously, significant processing and efficiency gains may be made.

A host-to-device map 505 may be stored within the GPU's memory. The host-to-device path map 505 may store device path IDs 506 which map the location of the host path id 503 of a path within the host memory 420 to the path head 507 of a corresponding path data structure 501.

The path data structures may each include a path head 507, which is a root node in a linked list data structure of blocks. The path head blocks contain descriptive information about the entire path calculated during the pull commands, such as the total number of blocks which were required for a path (i.e., total node count), how many lines and curves (i.e., segments 511) are in the path, as well as the path's 2D bounds (i.e., path bounds). The path head 507 may further include a head node id, which indicates the location of the first path node in the linked list of path nodes 509 which are in the path data structure 501. The path head 507 and its attached path nodes 509 may all be built from the same size blocks, although different block sizes are possible.

As further shown in FIG. 5, each path node may include a segment count which indicates the total number of segments within a respective path node, as well as an identification of the location of the next path node in the linked list (i.e., "next node id"). For the last path node in a path data structure, the next node id may be left as a null value, thereby indicating that no further path nodes are within the path data structure. Each path node may also include path segment blocks which are indices which point to blocks of data which describe the curve and line geometry of the path segments which make up the path represented by the path node. In this regard, the segment blocks may include a type segment block, which describes whether the coordinates pointed to by the coordinate blocks represent path segments which are linear or part of a curve, such as a cubic or quadratic segment. Lines may be described with two two-dimensional coordinates, such as (x0,y0)→(x1,y1), while curves, such as Bezier curves, may be described with either three or four two-dimensional coordinates.

Each path, including the path coordinates of each path segment which makes up the entire path, may be stored in the GPU's memory as shown in by paths 409 of FIG. 4. The path coordinates pointed to by the coordinate blocks in the path data structure may be retrieved from the paths 409 of the GPU. Such a path data structure may allow the path head 507 and each path node 509 to be updated in parallel using basic operations, such as 32-bit word atomic operations.

Figure 6:
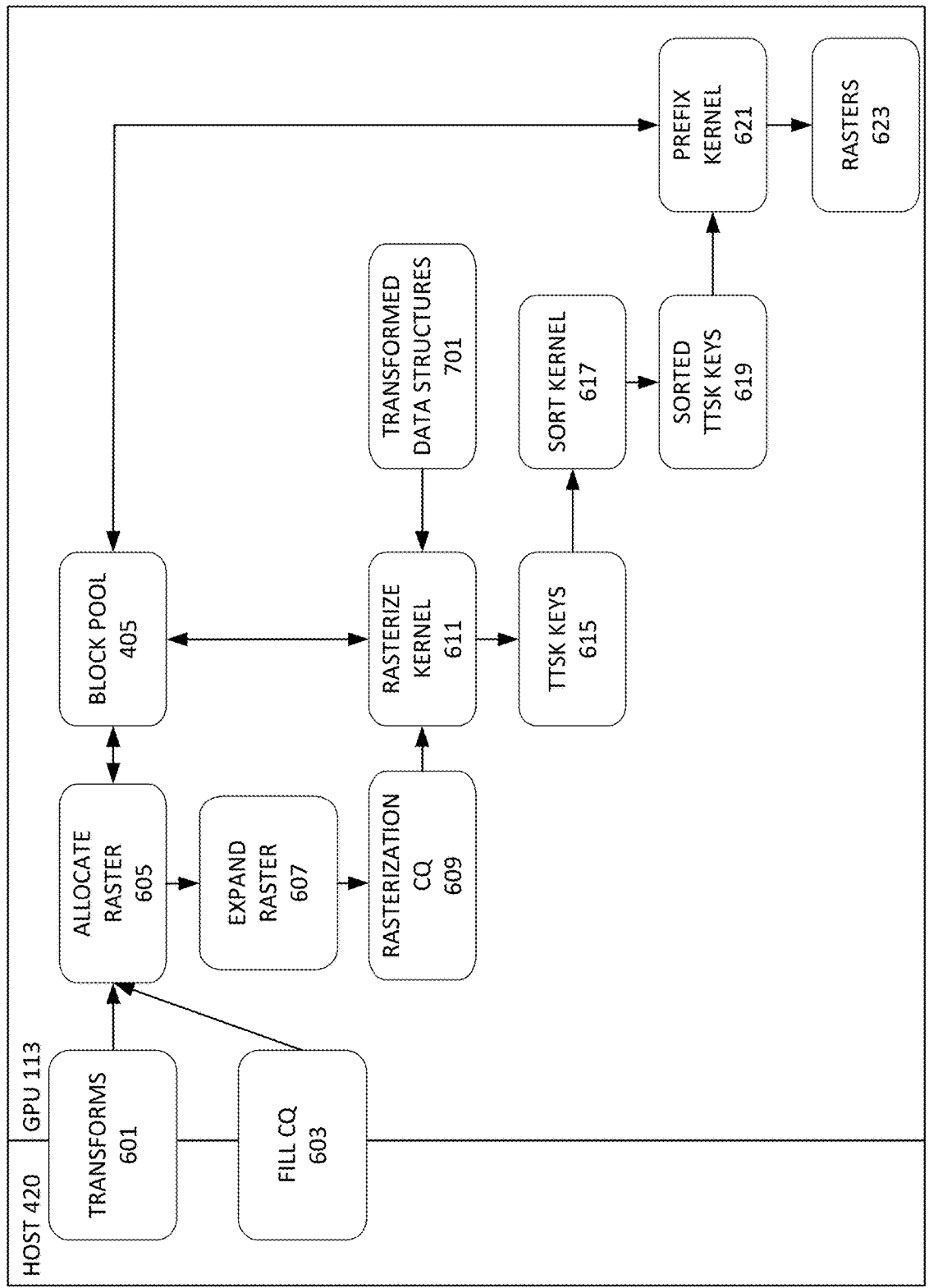
FIG. 6 is a block diagram of the rasterization process in accordance with aspects of the disclosure.

The path segments within the data structure may be rasterized by the GPU to create a raster which represents a transformed path that's suitable for rendering and other post-rasterization activities such as hit detection, clipping, and masking. Prior to rasterizing the paths 409, the GPU may execute additional kernels which prepare the GPU's memory and the paths for rasterization, as shown in FIG. 6. For instance, the GPU 113 may receive fill commands 603 from the host device. The fill commands 603 may be a 3-tuple or 4-tuple, or more or less, which provide information needed to perform the rasterization of the path segments. In this regard, the tuples may include data which indicates the host id of the path, the host id of the raster that is under construction, the raster cohort id (i.e., indicating a group of raster that are processed together) and/or a pointer (or index) to the transformation matrix that will be applied to this path before rasterization. The fill commands 603 may also include a pointer (or index) to a "clipping" region to clip the transformed paths before or during rasterization. The fill commands 603 may be read by the allocate raster and expand raster kernels, 605 and 607, respectively. The allocate raster and expand raster kernels may convert the fill commands 603 into finer-grained device-side rasterize commands 609, as described herein.

The GPU may execute a copy transforms kernel which copies one or more transformation matrices (i.e., transforms 601) into the GPU's memory from the memory of the host device when the GPU has separate memory from the host device. In this regard, before a vector path is rendered, the parallelized processing pipeline may receive a transformation request, such as a request to scale, rotate, shear, and/or translate a vector path. So each command to the rasterization kernel points to the data structure corresponding to a vector path and the transformation matrix that may be applied to the data structure prior to rasterization.

Figure 7:
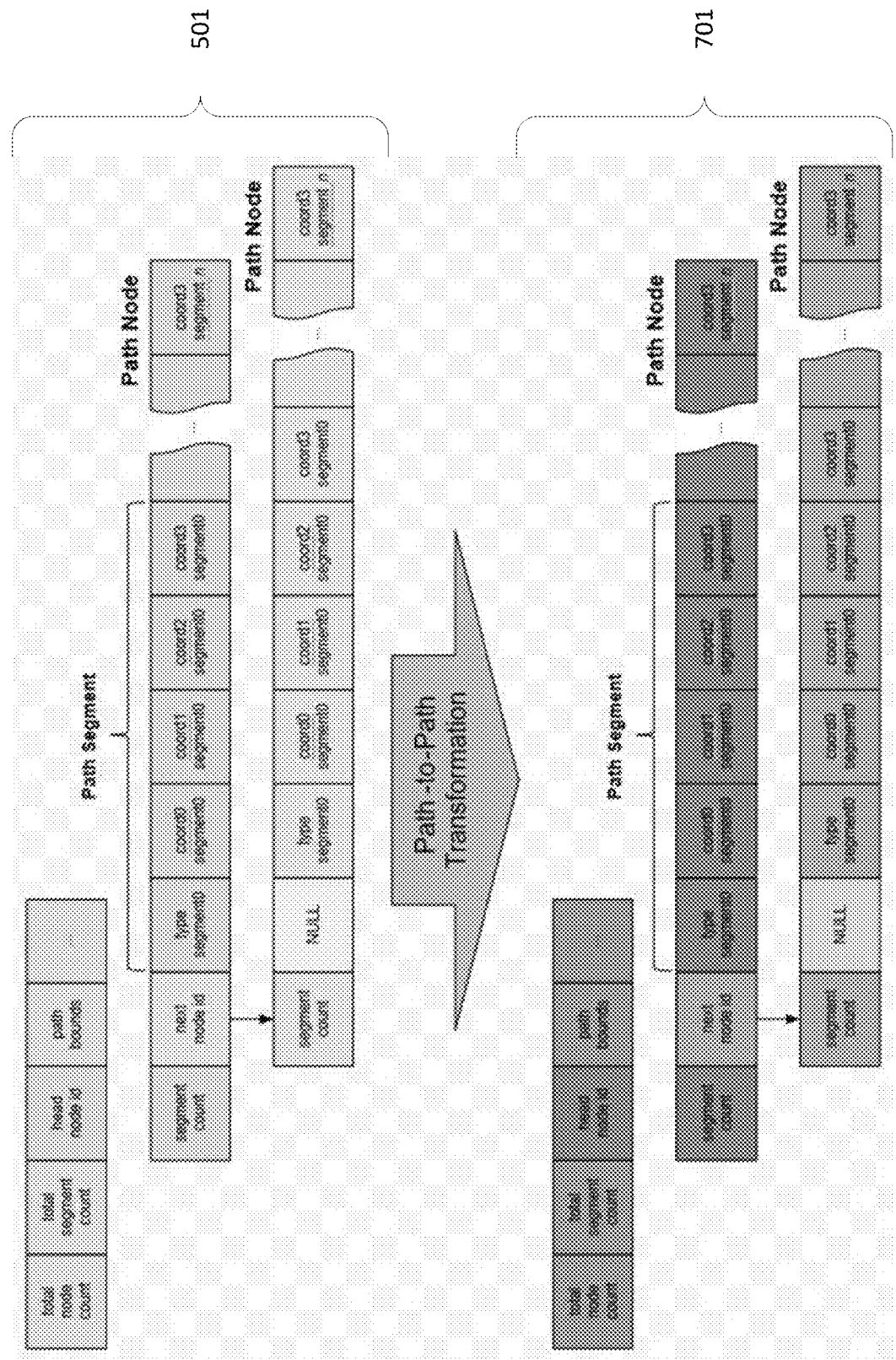
FIG. 7 is an example transformation flow in accordance with aspects of the disclosure.

As shown in FIG. 7, the data structure corresponding to a vector path may be transformed in parallel. In this regard, a matrix multiply may be performed on each two-dimensional coordinate pointed to by the path segments of each path node in the first data structure 501. The matrix multiply results in the overall vector path being scaled, rotated, sheared, and/or translated depending on which transformation matrices are applied. The transformed vector path may be stored in a transformed path 701. Each updated path, including the path coordinates of each updated path segment which makes up the entire path of the path 701 may be stored in the GPU's memory. For instance, a first path may contain four line segments which correspond to a rectangle. The four line segments may be subjected to a matrix multiple of a transformation matrix which applies curves to each of the four line segments The four line segments which result from the matrix multiply may be store in a transformed path.

The GPU may further execute an allocate raster kernel and an expand raster kernel. The allocate raster kernel 605 may cause the GPU to allocate and reserve memory blocks in the data block pool 405 for the raster heads which will be processed by the rasterize kernel 611, as described further herein.

Figure 8:
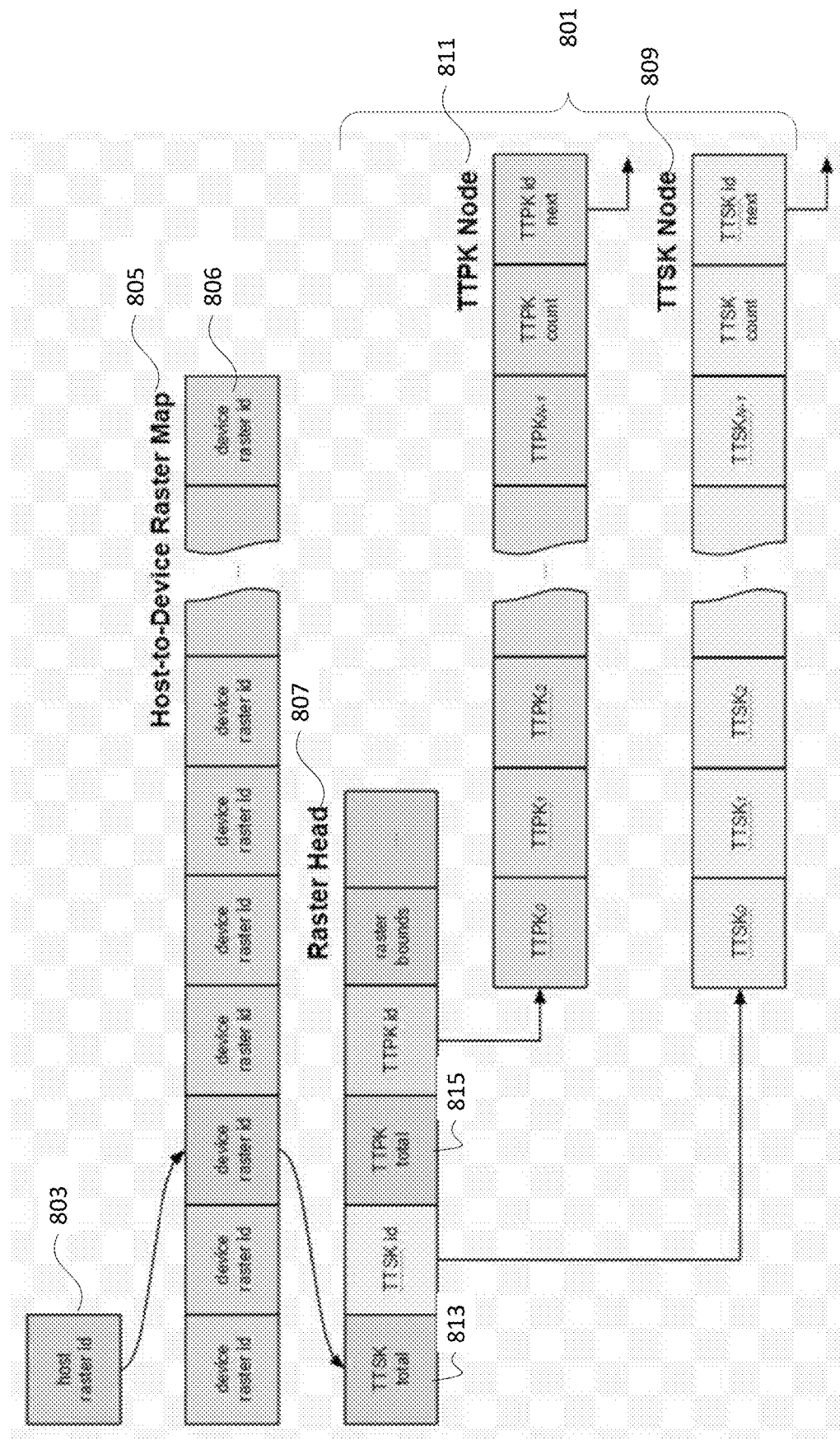
FIG. 8 is an example raster data structure in accordance with aspects of the disclosure.

The expand raster kernel 607 may cause the CPU to generate and update a raster cohort ID map which maps a raster cohort ID to a full-sized device raster ID, as shown in FIG. 8. The raster cohort ID map 805 may store device raster IDs (i.e., raster cohort IDs 806) which map the location of the host raster id 803 within the host memory to the raster head 807 of a corresponding raster data structure 801. A raster cohort ID 806 is a temporary ID that solves the problem that a 64-bit, or more or less, tile trace subpixel key (TTSK) structure does not provide enough room to point to a fixed size TTSB block containing tile trace subpixels (TTSs), its tile coordinates, and the fixed size block that represents the raster head 807. In this regard, since the GPU may only rasterize thousands of paths in parallel at any one instant in time, the TTSK node 809 does not need to record the 25-32 bit, or more or less, address of the raster head, but rather the TTSK node only needs to differentiate itself from the other raster nodes in its cohort. To allow for quick sorting of the TTSK's they may be kept small. Once raster post processing is complete, the true raster id (i.e., host raster ID 803) may be read back from the table using the smaller raster cohort id as an index.

Returning to FIG. 6, the GPU may launch the rasterize kernel 611 based on instructions received from the rasterization command queue 609. The rasterize kernel 611 may convert the transformed path segments in the transformed data structures 701 into rasters. In this regard, the rasterize kernel may split the lines and curves of the transformed path segments into subpixel line segments which define locations of the transformed path segments within the bounds of pixel tiles having a predefined width and height.

The subpixel line segments may be segregated into tiles and encoded as tile-relative tile trace subpixels (TTSs). A predefined number of TTSs, such as 16 or 32, may be held in tile trace subpixel block (TTSB) structures. TTSK keys 615, as shown in FIG. 6, may be generated which may point to respective TTSBs in addition to the raster cohort ID and the tile coordinates. The TTSKs may also indicate to which tile its contained TTSs belong.

In the event the transformed path segments are curves, they may be flattened into line segments prior to rasterization. For example, as shown in FIG. 9, curved segments may be subdivided and flattened into line segments in parallel by one or more processors in a processor group. As previously discussed, lines may be described with two two-dimensional coordinates, such as (x0,y0)→(x1,y1), while curves, such as Bezier curves, may be described with either three or four two-dimensional coordinates. In the event the Bezier curve is quadratic, it may be degree-elevated into cubics. Line segments may be represented as a four-coordinate structure (e.g., (x0,y0)→(x1,y1)) and may then be placed within a single processor and held in a level of four, or more or less, registers spanning the processor group. Cubics may be split across two adjacent processors within the processor group. For example, an eight-coordinate structure comprised of x0-x3 and y0-y3, representing a cubic may be positioned within a level of four registers spanning the processor group 901, as shown in FIG. 9. Starting with the X axis, each axis of a four-control point cubic may be on a single processor in the group and held in four register quads. For instance, x0-x3 may be stored in four registers of a first processor 903 and y0-y3 may be stored in four registers of a second processor 905. Every segment may be marked with a type indicating whether it's empty, a line, or a cubic "X" or "Y" segment. Each single-axis cubic control points may be subdivided resulting in eight control points still belonging to the same axis. These eight control points may reuse the four registers and temporarily use four more registers of the processor. All subdivided segments may be totaled and written to local memory.

A group-wide inclusive prefix sum may be performed with each processor of the processor group. A prefix sum is a common data-parallel algorithm for efficiently calculating a running total of N values, and may be inclusive or exclusive. In this regard, an inclusive prefix represents the sum total of all previous elements including the element itself. For example, the inclusive prefix sum of [1, 5, 3, 9] would be [1, 6, 9, 18], whereas an exclusive only counts the elements before the element itself. To calculate the group-wide inclusive prefix sum, each processor may contribute zero if the segment is already empty, one if the segment is a line, and $2^{16}$ if the segment is a cubic.

The inclusive prefix sum may be converted into an exclusive prefix sum such that every processor in the group has an index of where to store its segments. In this regard, when a processor is holding a line segment the low 16 bits, or more or less, of the prefix sum may be the offset of where to append the segment in shared local memory and when the processor is holding a cubic segment the high 16 bits, or more or less, of the prefix sum may represent the offset of where to append the cubic segments, although other bits may be used. The segments may be appended to existing queues of cubic or lines segments.

If there are any cubic segments, then the total number is compared to how many cubic segments are available in the previous level of registers. If there is a surplus of cubic segments then the processor group's operating level increases. The processor group's operating level is each respective row of registers used during the subdivision process. If there is a deficit then the operating level decreases. Otherwise, the operating level will remain the same. Once the new operating level is determined, the register quads are loaded with as many segments as possible. Next, the number of line segments in the shared local memory queue are totaled. If there are enough line segments enqueued then they're processed into subpixels, as described further herein. The conversion of the cubics may continue until there are no cubics left to subdivide. For example, if the GPU 113 has a natural transaction size of 16 words, then each multiprocessor may load a maximum of sixteen four-coordinate segments, which may represent as many as eight cubic curves. These eight cubic curves may be subdivided, resulting in sixteen cubic curves. If none of these smaller cubic curves are determined to be flat enough to be considered line segments, then eight of the smaller cubic curves may be saved in registers and then work on the remaining eight cubic curves containing sixteen four-coordinate segments, may be performed. When there are more subdivided curves than can be processed, in place then we need to increase the operating level (i.e., from level 0 to level 1).

In some instances, the number of subdivisions necessary to achieve a level of flatness may be estimated to reduce processing. In this regard, the number of subdivisions can be computed using either a conservative estimate or an optimistic estimate. The estimates may determine how many segments the curve should be divided in order for the segments to be considered line segments. The conservative estimate may assure that the segments are flat enough to be considered line segments. Using the estimated number of subdivisions, the progress group can cooperatively subdivide one or more cubic segments and reduce both shared local memory transactions and reduce the number of register levels necessary depending on how conservative the estimator is.

Figure 10:
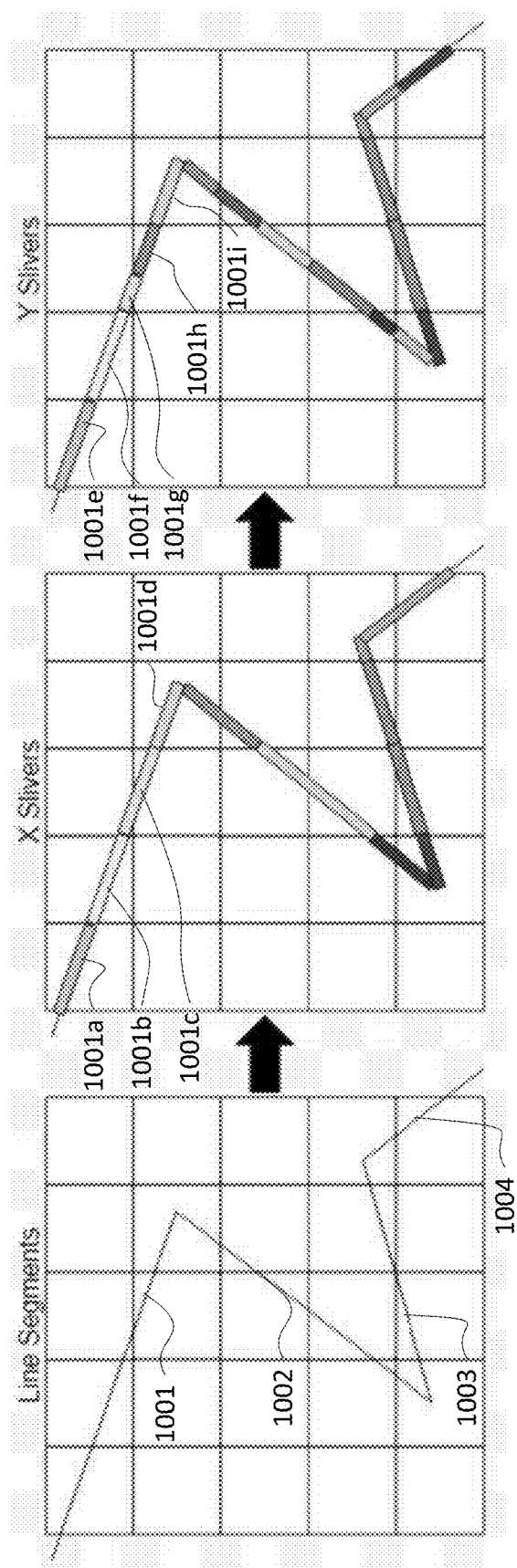
FIG. 10 is an illustration showing the creation of X and Y slivers in accordance with aspects of the disclosure.

The line segments may be directly converted to subpixels in several fully parallelized steps. In this regard, one or more processors in a group may load a line segment. For each loaded line segment, the total number of X slivers on the X axis may be calculated with a prefix sum, where a sliver is a line segment with an axis width of less than or equal to one pixel. Based on the prefix sum, one or more processors in the group may cooperatively load an X sliver from shared memory and calculates the (y0,y1) end points for the sliver and, if needed, update the end point of the slivered line segment in shared memory. The total number of Y slivers, which represent subpixels, for the processor group may be calculated with another prefix sum. For example, as shown in FIG. 10, lines segments 1001-1004 may be loaded into a processor group. Each line segment 1001-1004 may then be split into X slivers and Y slivers. For instance, line segment 1001 may be split in X slivers 1001a, 1001b, 1001c, and 1001d, where each of the slivers is defined by a Y coordinate crossing. Line segment 1001 may also be split into Y slivers 1001e, 1001f, 1001g, 10001h, and 1001i defined by X and Y coordinate crossings, with each Y sliver representing a subpixel.

The processor group may continue converting the line segments until there are enough subpixels to bin into TTSB blocks. In this regard, based upon the prefix sum, the processor group can cooperatively store up to processor group size subpixels into a shared local memory queue for binning and upon enough subpixels being queued, binning the subpixels into TTSB blocks, as described herein.

Each subpixel line segment may be placed into TTSB blocks. In this regard, based on the prefix sum, the processor group can cooperatively store up to processor group size subpixels into a shared local memory queue for binning. For example, FIG. 11 shows Y slivers 1001e and 1001f being placed into TTSB block 1101 and Y slivers 1001g-1001i being placed into TTSB block 1103, with other Y slivers of line segments 1001-1004 being placed in one of TTSB blocks 1101-1107, depending on its tile location. In some instances a hash of the tile coordinates may be used to determine which bin to use for a tile.

Figure 12:
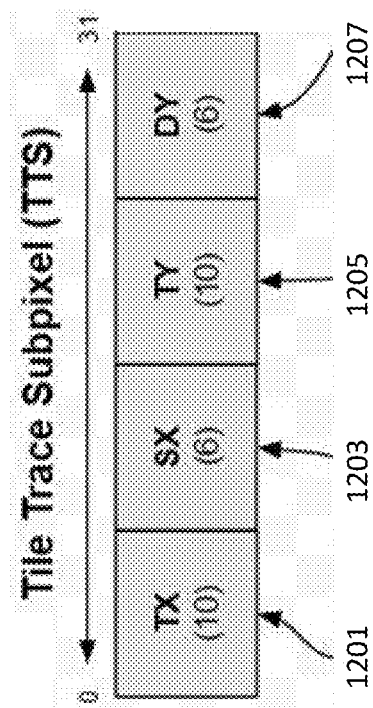
FIG. 12 is an illustration of a TTS structure in accordance with aspects of the disclosure.

Upon there being enough subpixels to fill a TTSB structure, or if the tile bin must be flushed, each subpixel line segment may be encoded in a tile trace subpixel (TTS) structure. In this regard, there may be a finite number of bins available to the processor group, and in the event the tile coordinates hash indexes a bin that is accumulating subpixels for a different tile then the tile may be flushed and a TTSK/RYX key may be created as a pointer to the flushed TTSB. An example TTS representing an example square 32×32 (32-bit) pixel tile with 5 bits of subpixel resolution is shown in FIG. 12, although rectangular tiles may also be used. TX 1201 represents an unsigned min(x0,x1) tile subpixel coordinate, SX 1203 represents an unsigned subpixel span from min to max x with range [0, 32], TY 1205 represents an unsigned min(y0,y1) tile subpixel coordinate, and DY 1207 represents a signed subpixel delta (y1-y0). The range of delta in DY may be [−32, 32] but horizontal lines may not be encoded so [1, 32] is mapped to [0, 31] and may be stored in 6 bits. Although the subpixel resolution is shown as 5 bits and tile size is shown as 32×32 pixels, resolution may be greater or fewer than 5 bits and the tile size may be smaller or larger than 32×32 pixels. In the event that subpixel translation of rasters is not requested, then there is no need to be able to derive the original direction of the line segment on the X axis and the SX value can be a scalar. Similarly, if pixel translation of rasters is not requested then only the pixel coordinate, area, and DYs need to be stored in the TTSK.

The tile trace subpixel keys may be sorted and segmented to enable parallel rendering of the paths based on their respective subkeys. For example, referring back to FIG. 6, upon producing the TTSKs 615, a sort and segment kernel 617 may be executed by the GPU to group the TTSKs by raster cohort ID, and sort the TTSKs by their subkeys. Each TTSK may include three subkeys, or more or less, including a raster cohort ID, a Y tile coordinate, and a X tile coordinate. The TTSKs may be sorted according to the subkeys. After the sortation is complete, the TTSKs may be grouped by each raster cohort ID, Y tile coordinate, and X tile coordinate.

The TTSK sort and segment kernel 617 may compare each sorted TTSK with its predecessor and if a certain number of bits differ, then an index of the sorted TTSKs is appended to an extent. In this regard, each index marks the beginning of a sequence of TTSK that belong to a raster cohort ID. The sort and segment kernel 617 step may also calculate exactly how many TTPB blocks and TTPK nodes will required by the PREFIX post-processing stage. The number of TTSK nodes is simply a function of the number of TTSK keys. The total number of TTPB blocks, TTPK nodes and TTSK nodes may be allocated from the block pool 405 before executing the prefix kernel.

The tile trace prefix block (TTPB) must be synthesized from each TTSB's TTS values in order to render the original vector path. In this regard, the TTSBs produced by the rasterize kernel and the TTSKs processed by the TTSK sort and segment kernel may require an additional post-processing step. Referring again to FIG. 6, the prefix kernel 621 may sweep the TTS values from left to right across all the tile's columns and for each row in the tile ("scanline") to accumulate the signed vertical component of each TTS subpixel line. Note that the subpixel lines have "direction". This single-column of accumulated vertical values is the TTPB and may be 16 to 32 signed integers, or more or less. This column of data represents the previous tile's potential contribution to the tile on its right.

In an example, the vector graphic attempting to be displayed may be a large version of the letter "A" such that it covers many 16×16 pixels tiles, then there would be a large amount of empty space in the inner upper triangle. The tiles in the empty space do not need to display any pixels, but the inner edge of the right hand side of the triangle needs to know the contribution of all of the paths that were drawn to its left, which could be many tiles. The TTPB represents the "carried in" value that's necessary to perform the final pixel coverage calculation. By using both the TTPBs and TTSBs each tile may perform its rendering in complete isolation.

For each index, the GPU may execute the prefix kernel which sequentially loads the TTSKs within the index and stores the TTSKs into the preallocated TTSK nodes. The prefix kernel may, upon determining that the TTSK tile coordinates change upon loading a sequential TTSK, store the accumulated tile trace prefix (TTP) values into the preallocated TTPB block, construct a TTPK key, and store the TTPK key into the preallocated TTPK node. In the event the TTSK raster ID changes, the prefix kernel may exit. The TTSs in the TTSB block may then be assigned a pointer to the TTSK key and the TTS altitudes may be scatter-added to a 1×H array, where H is a number of columns.

At the end of the prefix stage, each raster 623 may have the following associated data: a) a list of TTSK nodes 809 containing TTSKs pointing to TTSBs containing TTSs; b) a list of TTPK nodes 811 containing TTPKs pointing to TTPBs containing TTP altitudes; c) a total count of TTSKs 813; d) a total count of TTPKs 815; and e) tight axis-aligned bounds with subpixel resolution, as shown in the raster data structure of FIG. 8. In some embodiments a long path may require multiple passes through the rasterize, sort and segment, and prefix kernels to be processed.

Figure 13:
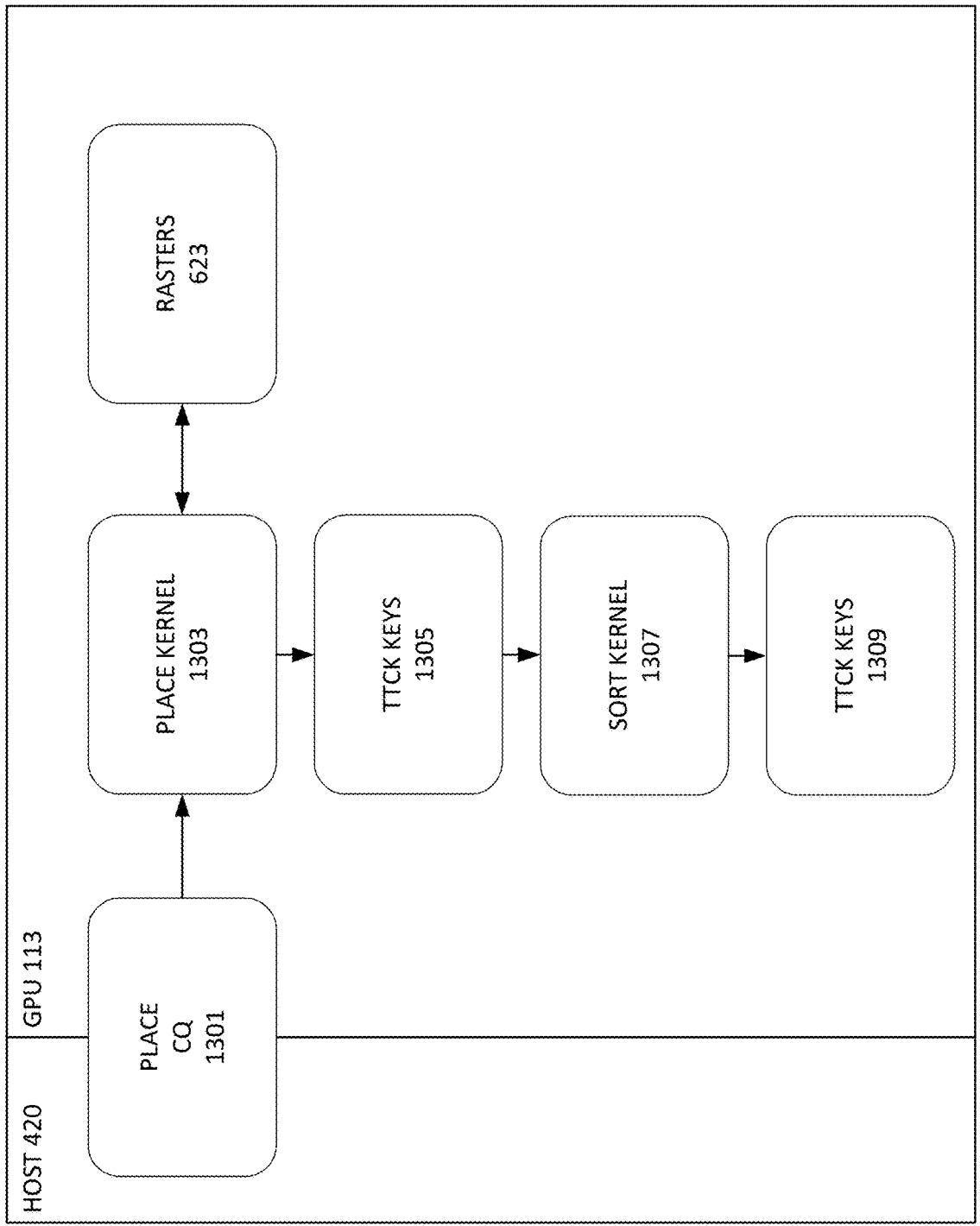
FIG. 13 is a block diagram outlining the placement and sorting of rasters in accordance with aspects of the disclosure.

Upon prefixing the data, a place kernel may executed by the GPU to specify that a raster should be subpixel translated and then rendered on a particular layer in a composition comprised of an array of tile trace composition keys (TTCKs). Each composition may be treated as one or more bins of spatially partitioned TTCK keys. For example, a place command queue 1301 may be filled with place commands that cause the GPU to execute a place kernel 1303, as shown in FIG. 13. In this regard, the place kernel 1303 may cause execution groups, corresponding to the GPUs processors, to each determine if the raster's 623 bounds are in or outside of the composition bounds. In the event the raster's bounds are outside of the composition the place determination is cancelled. Otherwise, for all TTSKs in the TTSK node the place kernel a) translates the TTSK key; b) converts the TTSK key into a TTCK key; c) appends the TTCK key to a local queue; and d) in the event the local queue is full or needs to be flushed then append it to the composition's TTCK key extent.

Similarly, for all TTPK keys in the TTPK node hierarchy the place kernel 1303 causes the GPU to a) translate the TTPK key; b) expand the TTPK key since it may span multiple tiles; c) clip the expanded tile range; d) convert each TTPK key into a TTCK key; e) append each TTCK key to a local spatially binned queue; and f) if the local spatially binned queue is full or needs to be flushed, then append it to the composition's one or more spatially binned TTCK key extents. Again, as the tile position of each TTCK is known, the composition may be treated as one or more bins of spatially partitioned TTCK keys. As such, the number of bits required to represent the tile's X and Y coordinates in the TTCK composition may be reduced.

The place kernel 1303 may reuse a raster object by generating up to four times as many TTCK keys that carry a tile resolution translation offset (dx,dy) that indicates how the TTSB and TTPB words should be translated within the tile. In this regard, before the TTS and TTP words are scattered into the shared local memory accumulators, the translation is applied and the values may be clipped appropriately. TTP words to the "left" of tile may be clamped and accumulate in a column 0. In the event that translation of rasterized paths is not a requirement, then the TTS and TTP words can pre-compute their area contributions in the rasterize kernel, discussed further herein.

The TTCKs may be sorted by a second sort and segment kernel 1307 to sort the TTCKs in a spatially partitioned bin. In this regard, the TTCKs may be sorted such that the TTCKs which belong to the same tile are in increasing layer order. The sort and segment kernel may further locate the starting index of the first TTCK for a tile. For example, the TTCKs may be treated as 64-bit, or more or less, unsigned integers and on a predefined number of high bits 'T' of the 64-bits may be compared. For purposes of the second sort and segment kernel 1307, the entire composition may have a single bin, so partitioning may not be needed. Three subkeys, or more or less, including a Y tile coordinate, a X tile coordinate, and a layer index may be found in the 'T' bits. Upon completion of the sortation, the TTCKs may be grouped by each tile coordinate and in increasing layer order.

The TTCK sort and segment kernel 1303 may cause the GPU 113 to compare each sorted TTCK with its predecessor. In the event that a predefined number of bits differ then the index of the sorted index, the sorted TTCK is appended to an extent. Each index may mark the beginning of a sequence of TTCKs that belong to a tile at position (X,Y). The sorted TTCKs 1309 may be stored in the data block pool 405.

As the tile position of each TTCK key is known, there may be opportunities to ease the sorting complexity of the TTCK sorting phase. In this regard, a composition is an array of TTCK keys and can be treated as one or more bins of spatially partitioned TTCK keys. The composition's partitioning can be as small as one bin per tile coordinate. By spatially partitioning the composition the number of bits required to represent the tile's X and Y coordinates in the TTCK key may be reduced.

Upon sorting and segmenting the TTCKs, the rasters may be rendered. In this regard, a render kernel may launch an execution group for each tile in the TTCK key extent. The function of each execution group is to decode the TTCK keys into filled path outlines that are blended with adjacent layers. In this regard, each execution group processes a fixed-size tile of pixels and allocates various tile-sized blocks of memory. When there are no more keys left to process or the tile is commanded to flush, the blended pixels are stored or composited onto a target surface. For instance, as shown in FIG. 14, the render kernel 1403, executing on the GPU, may receive the TTCKs 1309 and styling information 1401. The render kernel may render the rasters 623 into a framebuffer 1405 for output onto a display.

For each common-tile TTCK sequence loaded to an execution group, the render kernel 1403 may cause the execution groups to, in parallel, perform the following steps:
1. Load the first TTCK key in the sequence.
2. Record this key's (X,Y) position and Layer index.
3. Clear the tile altitude and area accumulators.
4. Scatter-add the words of the TTSB or TTPB block to the appropriate accumulator.
5. Load the next key.
6. If the next key has the same Y, X and Layer index values then goto 4.
7. Otherwise, temporarily save this TTCK key.
8. Load the Group ID associated with the current layer.
9. If the current layer's Group ID matches the work-in-progress Group ID:
   a. Load and execute all commands associated with this layer
   b. The saved TTCK key is now the current TTCK key
   c. Goto 3.
10. If the current layer's Group ID is within the current Group's layer range:
    a. We know that the current layer belongs to a group deeper in the hierarchy.
    b. For all Group IDs between the current Group ID and the parent group of the current layer:
       i. Load and execute all commands associated with entering this Group ID
       ii. Update the current depth, layer range and Group ID.
    c. Load and execute all commands associated with this layer
    d. The saved TTCK key is now the current TTCK key
    e. Goto 3.
11. Otherwise, the layer must belong to a cousin in the group hierarchy.
    a. Load and execute all commands associated with exiting the current Group ID
    b. Update the current depth, layer range and Group ID.
    c. Goto 9.d The above steps for rendering the rasters recognize that a line segment's signed contribution to a polygon's total area is $((x0+x1)*(y1-y0))/2$, which is also the area of a left trapezoid. Another simplification may include ignoring the denominator and proceeding with a contribution that's scaled by two (i.e., $((x0+x1)*dy)$.) These oriented area contributions may be accumulated to produce a signed total area of the polygon that is scaled by two.

The polygon area formula can be used to calculate the covered area of each pixel on a scanline. In this regard, scanlines are typically processed in the increasing x direction (i.e., left to right), thereby necessitating that each pixel on a scanline "carry in" any accumulated coverage from the pixels to its left. This "carry in" value may be equated to the summation of all $dy_i$ values to the left of the current pixel multiplied by the subpixel resolution along the x axis:

$$\left(\sum_{i=0}^{n-1} dy_i\right) * \text{SUBPIXEL.WIDTH} * 2$$

Figure 15:
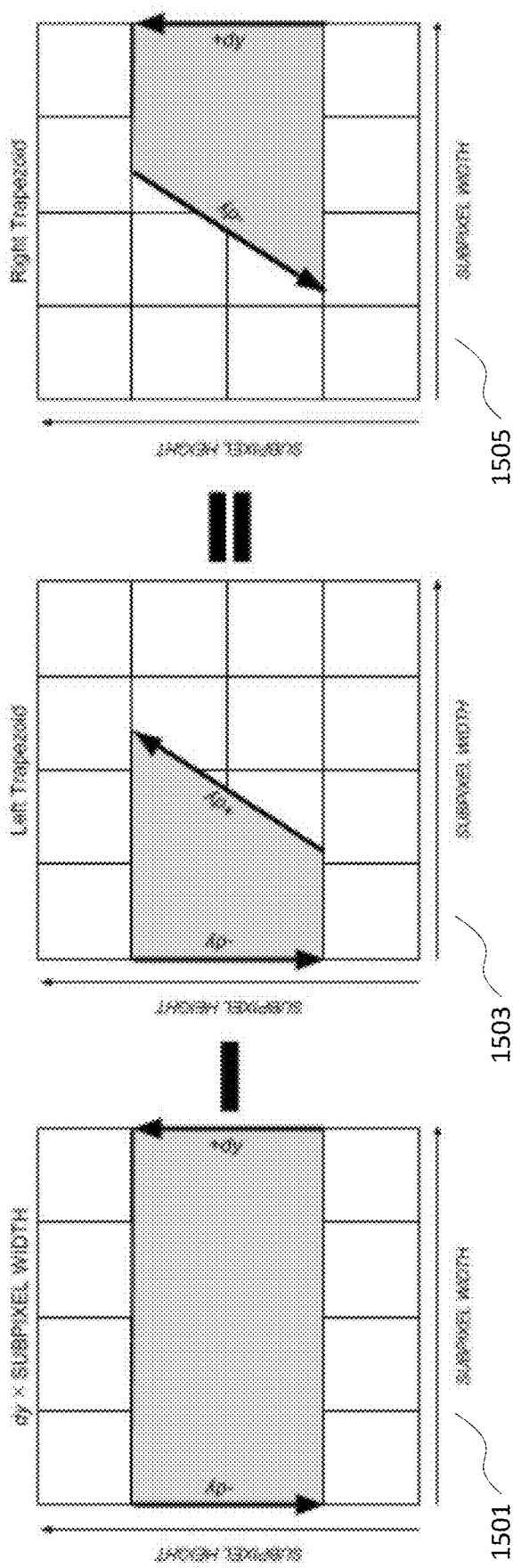
FIG. 15 is an illustration of a conversion from a left trapezoid to a right trapezoid in accordance with aspects of the disclosure.

The left trapezoidal area result may be converted to a right trapezoidal area in order to utilize the above equation. To convert the left trapezoid to a right trapezoid, as shown in FIG. 15, the right trapezoid 1505 may be found by removing the left trapezoid 1503 from the entire subpixel width and height 1501. In the event scanlines are processed in decreasing x order, the conversion from a left trapezoidal area to a right trapezoidal area may be skipped.

Based on the above conversion to a right trapezoidal area, the total fractional coverage of a pixel may be equal to:

$$\frac{\left(\sum_{i=0}^{n-1} dy_i\right) * \text{SUBPIXEL.WIDTH} * 2 +}{\text{SUBPIXEL.WIDTH} * \text{SUBPIXEL.HEIGHT} * 2}$$

$$\frac{(dy_n * \text{SUBPIXEL.WIDTH} * 2 - (x0_n + x1_n) * dy_n)}{\text{SUBPIXEL.WIDTH} * \text{SUBPIXEL.HEIGHT} * 2}$$

Which may be simplified to the following equation:

$$\frac{\left(\sum_{i=0}^{n-1}dy_i\right)*\text{SUBPIXEL.RESOLUTION}_x*2-(x0_n+x1_n)*dy_n}{\text{SUBPIXEL.RESOLUTION}_x*\text{SUBPIXEL.RESOLUTION}_y*2}$$

The subpixel coverage area calculation can be parallelized and made suitable for parallel processing by grouping subpixel line segments into common tiles with dimensions that fit the width of the GPU's 113 native execution width. In order to compute the coverage of each pixel in a tile, each subpixel line segment intersecting the tile can compute its oriented area contribution and scatter-add its oriented area contribution into a tile matrix residing in the GPU's memory. Such an accumulation may continue until all intersecting subpixel line segments have been scatter-added. Similarly, the coverage contribution of tiles to the left of each tile on a tile-line can be computed with a data-parallel prefix sum algorithm. Furthermore, if the heights of the tiles match the data parallel device's native execution width then the prefix sum can be performed with throughput only limited by available memory bandwidth. Moreover, given all the rasterized subpixel line segment outlines and "carried-in" coverage contributions of tiles to the left, the coverage of each pixel in the tile can be computed in one pass and with minimal computation.

There may be one or more number of possible layer, group entry, and group exit commands. For example, these commands may include layer nonzero and even-odd coverage calculations; layer coverage accumulation, masking, inversion and initialization; layer color solid fill and gradient fill; inter-layer blending using Porter-Duff blending rules; Inter-group blending operations; framebuffer write or blend; execution group state save and restore; coordinated execution of external operations; opacity tests for early exit.

Figure 16:
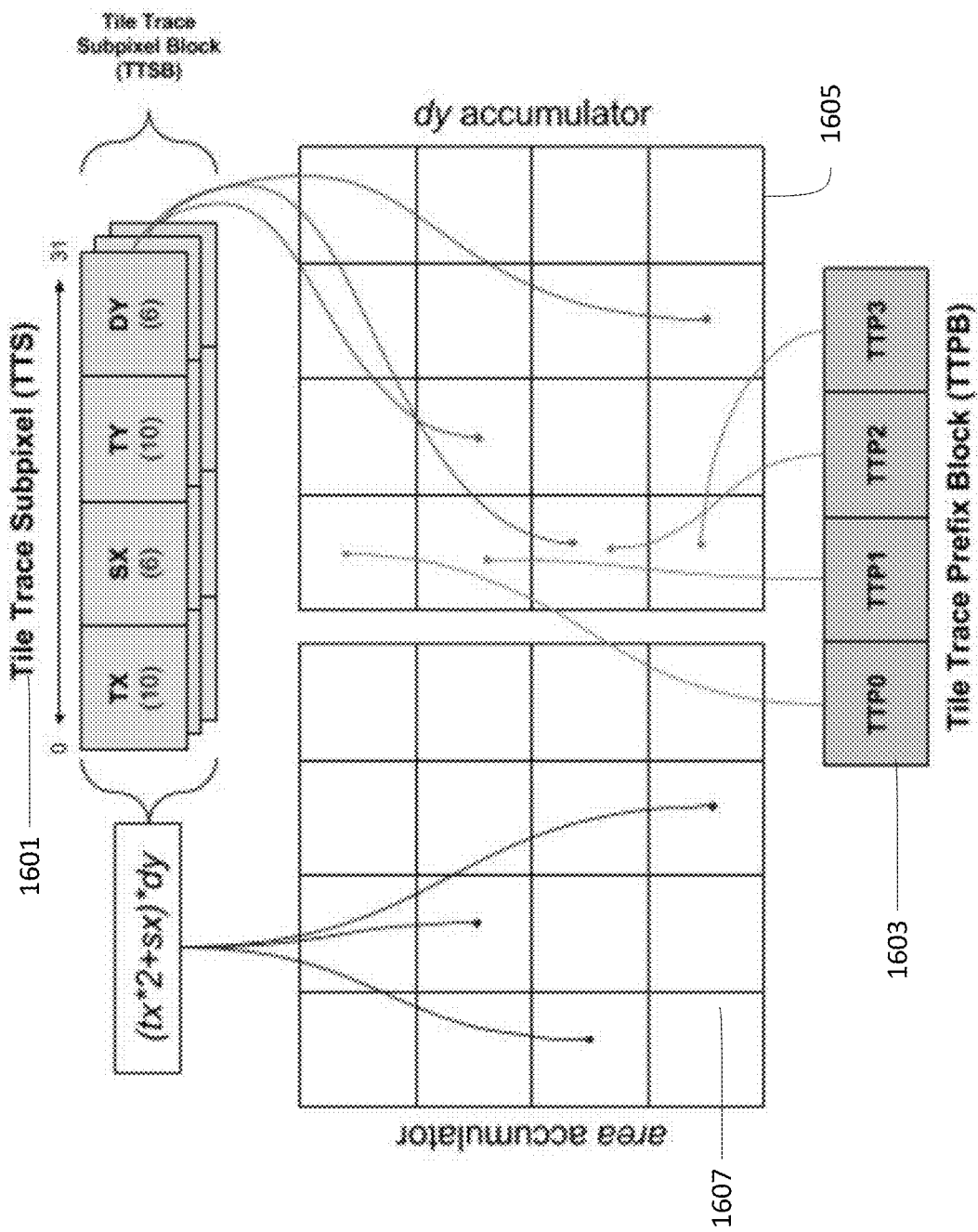
FIG. 16 is an illustration of a dual accumulator in accordance with aspects of the disclosure.

In order to scatter-add the words of the TTSB or TTPB block to the appropriate accumulator, a single or dual accumulator may be used. Turning first to the dual accumulator, for all TTSB and TTPB blocks pointed to by a TTCK key and belonging to the same layer, the area, which is a right trapezoid, and dy values may be scatter-added into the shared local memory accumulators. For example, as shown in FIG. 16, the data stored within the TTSs 1601 found within TTSBs may be scatter-added into two memory accumulators including the area accumulator 1607 and the dy accumulator 1605. The data with the TTPs 1603 found within the TTBPs may be scatter-added into the dy accumulator 1605. The pixel coverage for a column, j, may then be found using the following dual accumulator equation:

$$\text{coverage.column}_j = \frac{\left(\sum_{i=0}^{j}dy.\text{column}_i\right)*\text{SUBPIXEL.RESOLUTION}_x*2-\text{area.column}_j}{\text{SUBPIXEL.RESOLUTION}_x*\text{SUBPIXEL.RESOLUTION}_y*2}$$

Figure 17:
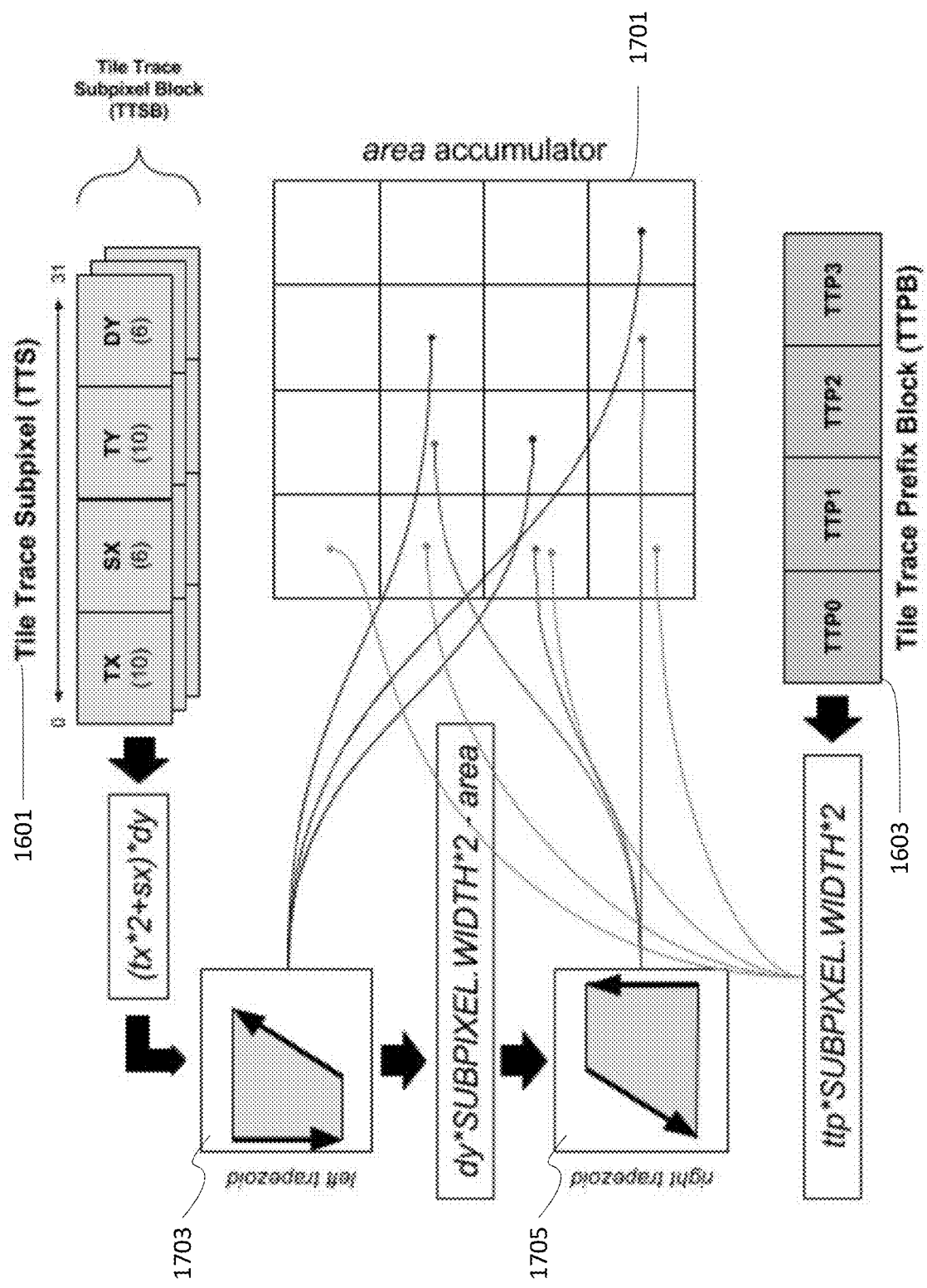
FIG. 17 is an illustration of a single accumulator in accordance with aspects of the disclosure.

Turning now to the single accumulator, for all TTSB and TTPB blocks pointed to by a TTCK key and belonging to the same layer, right trapezoid areas and left trapezoid areas may be scatter-added into the single shared local memory area accumulator. For example, as shown in FIG. 17, the data stored within the TTSs 1601 found within TTSBs and the TTPs 1603 found within the TTBPs may be scatter-added into the area accumulator 1701. In this regard, the right trapezoid areas 1705 and left trapezoid areas 1703, defined by the TTSs, may be scatter-added into the area accumulator 1701. The dual accumulator equation can be transformed into an equivalent single accumulator calculation by recognizing the pixel to the right of the subpixel line segment. Once this is done, the pixel coverage for column j using the following equation:

$$\text{coverage.column}_j = \frac{\sum_{i=0}^{j}\text{area.column}_j}{\text{SUBPIXEL.RESOLUTION}_x*\text{SUBPIXEL.RESOLUTION}_y*2}$$

Post-rasterization activities such as hit detection, clipping, and masking may use the parallel pipeline. The data composition used in the parallel pipeline is a collection of TTCK keys that have been sorted in tile Y, tile X and Layer (YXL) order, which may be used for purposes other than rendering. For example, a hit detection kernel may efficiently query, in parallel, the data composition to determine if one or more user input points or regions intersect any filled paths on layers in the composition. In this regard, the hit detection kernel returns a list of tiles and layers which have paths that would intersect the input points or regions. The reported layer index may also be used to determine the ancestral path of Group IDs enclosing the layer. In an example, a composition that includes completely transparent control points that can be tested with the hit detection kernel and then restyled and made opaque if there is an intersection in order to simplify development of graphics applications that require user input and tracking.

External operations may be scheduled by the render kernel 1403. In this regard, an external operation may involve multiple tiles and cannot start until all potentially involved tiles have suspended processing. Examples of such operations may include transforming an intermediate layer with a blur, sharpen, rotation or scaling kernel; subpixel antialiasing using neighboring pixel color and coverage data; performing a blit from one region to another region on a surface; blitting from one surface to another; loading and processing from one region and storing to another region; and rendezvousing with an external pipeline.

The tiles that must be suspended before an external operation can begin may be defined with a raster placed onto a layer. In the event the rasterized path REGION 0 overlaps a tile then the tile execution group suspends rendering, saves the tile's state and registers that the tile has been suspended on the coordinated external operation descriptor associated with this layer. Since the descriptor already has the total count of tiles that intersect the REGION N raster so the last tile to register its suspension can initiate the execution of the external operation.

An external operation may perform multiple processing steps affecting multiple independent but possibly overlapping regions. If the regions and processing steps are independent then each region can be represented with its own layer and descriptor. When an external operation determines that it is complete, the suspended tiles may be released back to the render stage. A suspended tile may eventually be assigned to an execution group and has it state restored and processing may be resumed.

The entire parallel pipeline may masquerades as an immediate mode API that hides the pipeline's asynchronous execution. In this regard, the API's in the pipeline are designed for ease of use and so that the path and raster API functions can usually be invoked without blocking. The API represents path and raster resources with host-side references that are immediately usable but represent resources that may not be available.

The API's in the pipeline may also supports reclaiming the resources associated with these host-side references to paths and rasters. As previously discussed, the path and raster host IDs map to device-side IDs and the device-side path and raster data structures consist of blocks allocated from one or more fixed-size block pools on the GPU. A release kernel may walk the path and raster data structures and returns each block to the data block pool.

Figure 18:
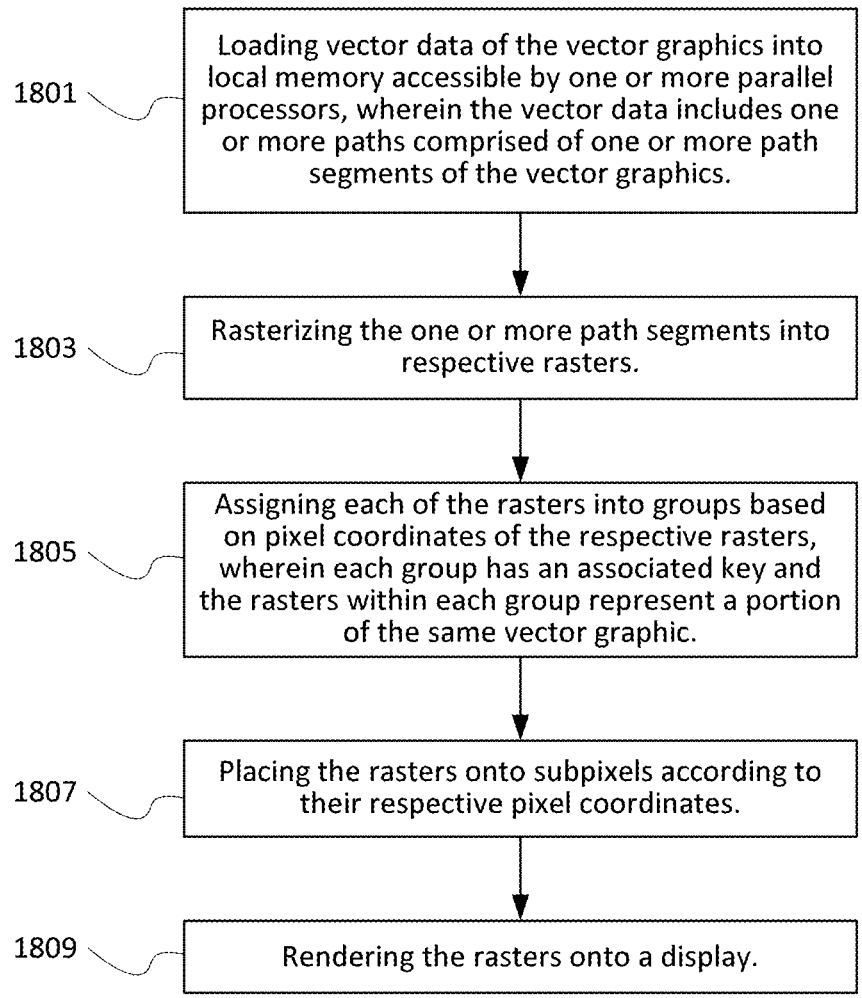
FIG. 18 is a flow diagram in accordance with aspects of the disclosure.

Flow diagram 1800 of FIG. 18 is an example flow diagram of some of the aspects described above that may be performed by one or more computing devices such as client computing devices 120, 130, or 140. It is understood that the steps discussed herein are merely an example; the steps may occur in a different order, steps may be added, and steps may be omitted. In this example, vector data of the vector graphics, may be loaded into local memory accessible by the one or more parallel processors, as shown in block 1801. The vector data may include one or more paths comprised of one or more path segments of the vector graphics, as shown in block 1803. The one or more parallel processors may rasterize the one or more path segments into respective rasters and assign each of the rasters into groups based on pixel coordinates of the respective rasters, with each group may have an associated key and the rasters within each group represent a portion of the same vector graphic, as shown in block 1805. The rasters may be placed onto subpixels according to their respective pixel coordinates and rendered onto a display by the one or more parallel processors, as shown in blocks 1807 and 1809, respectively.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for rasterizing and compositing vector graphics in parallel on a data-parallel computing device, the method comprising:

loading, by one or more parallel processors, vector data of the vector graphics into local memory accessible by the one or more parallel processors, wherein the vector data includes one or more paths comprised of one or more path segments of the vector graphics;

rasterizing, by the one or more parallel processors, the one or more path segments into respective rasters;

assigning, by the one or more parallel processors, each of the respective rasters to a group of rasters based on pixel coordinates of the respective rasters, wherein each group of rasters has an associated subpixel key and the rasters within each group of rasters represent a portion of the same vector graphic;

placing, by the one or more parallel processors, the rasters onto subpixels according to their respective pixel coordinates; and rendering, by the one or more parallel processors, the rasters onto a display based on the subpixel keys associated with the groups of rasters.

2. The method of claim 1, wherein loading the vector data occurs in response to the one or more parallel processors receiving one or more pull commands which identify a location of the vector data in a host memory.

3. The method of claim 1, wherein loading the vector data further includes simultaneously building a path data structure for each of the one or more paths in the vector data.

4. The method of claim 3, wherein each path data structure includes a respective path head as a root node to linked list data structures comprising blocks, each respective path head containing descriptive information about a total path calculated during the one or more pull commands.

5. The method of claim 4, wherein, for each path head, the descriptive information about the total path includes one or more of (i) a total number of blocks which were required for a path, (ii) how many lines and curves are in the path, (iii) the total path's 2D bounds, and (iv) a head node indicating a location of a first path node in the linked list data structure.

6. The method of claim 4, wherein each path head is associated with one or more path nodes.

7. The method of claim 6, wherein each path node includes a segment count block which stores a total number of segments within the respective path node and a next node block which stores a location of the next path node in the linked list.

8. The method of claim 4, wherein each path node includes path segment blocks storing indices which point to blocks of data associated with the one or more path segments.

9. The method of claim 8, wherein the path segment blocks include a type block which defines geometry of the path segments which make up the path represented by the path node, wherein the geometry comprises one or more curves or line segments.

10. The method of claim 1, wherein the rasterizing includes converting path segments into tile trace subpixels (TTSs), and packing the TTSs into tile trace subpixel blocks (TTSBs).

11. The method of claim 1, wherein the subpixel key is a tile trace subpixel key (TTSK) that records a raster cohort ID, tile coordinates, and an address of a tile trace subpixel block (TTSB).

12. The method of claim 11, wherein the TTSK is appended to a queue in the local memory.

13. The method of claim 1, wherein the subpixel key includes one or more subpixel subkeys associated with the paths.

14. A non-transitory computer readable medium storing instructions, which when executed by one or more parallel processors, cause the one or more parallel processors to perform the steps of:

loading vector data of vector graphics into local memory accessible by the one or more parallel processors, wherein the vector data includes one or more paths comprised of one or more path segments of the vector graphics;

rasterizing the one or more path segments into respective rasters;

assigning each of the respective rasters to a group of rasters based on pixel coordinates of the respective rasters, wherein each group of rasters has an associated subpixel key and the rasters within each group of rasters represent a portion of the same vector graphic;

placing rasters onto subpixels according to their respective pixel coordinates; and rendering the rasters onto a display based on the subpixel keys associated with the groups of rasters.

15. The non-transitory medium of claim 14 wherein loading the vector data occurs in response to the one or more parallel processors receiving one or more pull commands which identify a location of the vector data in a host memory.

16. The non-transitory medium of claim 14, wherein loading the vector data further includes simultaneously building a path data structure for each of the one or more paths in the vector data.

17. The non-transitory medium of claim 16, wherein each path data structure includes a respective path head as a root node to linked list data structures comprising blocks, each respective path head containing descriptive information about a total path calculated during one or more pull commands.

18. The non-transitory medium of claim 17, wherein, for each path head, the descriptive information about the total path includes one or more of (i) a total number of blocks which were required for a path, (ii) how many lines and curves are in the path, (iii) the total path's 2D bounds, and (iv) a head node indicating a location of a first path node in the linked list data structure.

19. The non-transitory medium of claim 17, wherein each path head is associated with one or more path nodes.

20. The non-transitory medium of claim 19, wherein each path node includes a segment count block which stores a total number of segments within the respective path node and a next node block which stores a location of the next path node in the linked list.

21. The non-transitory medium of claim 17, wherein each path node includes path segment blocks storing indices which point to blocks of data associated with the one or more path segments.

22. The non-transitory medium of claim 21, wherein the path segment blocks include a type block which defines geometry of the path segments which make up the path represented by the path node, wherein the geometry comprises one or more curves or line segments.

23. A system for rasterizing and compositing vector graphics in parallel comprising:

one or more data-parallel computing devices; and memory storing instructions, the instructions executable by the one or more data-parallel computing devices, wherein the instructions comprise:

loading vector data of vector graphics into local memory accessible by the one or more parallel processors, wherein the vector data includes one or more paths comprised of one or more path segments of the vector graphics;

rasterizing the one or more path segments into respective rasters;

assigning each of the respective rasters to a group of rasters based on pixel coordinates of the respective rasters, wherein each group of rasters has an associated subpixel key and the rasters within each group of rasters represent a portion of the same vector graphic;

placing rasters onto subpixels according to their respective pixel coordinates; and rendering the rasters onto a display based on the subpixel keys associated with the groups of rasters.

\* \* \* \* \*

UNITED STATES PATENT AND TRADEMARK OFFICE
CERTIFICATE OF CORRECTION

| | |
|---|---|
| PATENT NO. | : 11,557,017 B2 |
| APPLICATION NO. | : 16/613169 |
| DATED | : January 17, 2023 |
| INVENTOR(S) | : Allan Stuart Mackinnon, Jr. |

It is certified that error appears in the above-identified patent and that said Letters Patent is hereby corrected as shown below:

In the Claims

Column 24, Line 21, Claim 23:
Now reads: "parallel processors"; should read -- data-parallel computing devices --

Signed and Sealed this
Fourteenth Day of March, 2023

Katherine Kelly Vidal
*Director of the United States Patent and Trademark Office*